US012641439B2

(12) United States Patent
Yang

(10) Patent No.: US 12,641,439 B2
(45) Date of Patent: May 26, 2026

(54) SYSTEMS AND METHODS FOR RADIO RESOURCE PARTITIONING AND ADMISSION CONTROL FOR A RADIO ACCESS NETWORK BASED ON PER-USER EQUIPMENT FACTORS

(71) Applicant: Verizon Patent and Licensing Inc., Basking Ridge, NJ (US)

(72) Inventor: Jin Yang, Orinda, CA (US)

(73) Assignee: Verizo n Patent and Licensing Inc., Basking Ridge, NJ (US)

( * ) Notice: Subject to any disclaimer, the term of this patent is extended or adjusted under 35 U.S.C. 154(b) by 324 days.

(21) Appl. No.: 18/416,502

(22) Filed: Jan. 18, 2024

(65) Prior Publication Data

US 2025/0240630 A1     Jul. 24, 2025

(51) Int. Cl.
*H04W 4/00*          (2018.01)
*H04B 17/318*          (2015.01)
(Continued)

(52) U.S. Cl.
CPC .......... *H04W 16/04* (2013.01); *H04B 17/328* (2023.05); *H04B 17/336* (2015.01); *H04W 24/10* (2013.01)

(58) Field of Classification Search
CPC ..... H04W 16/04; H04W 24/10; H04W 24/02; H04B 17/328; H04B 17/336
See application file for complete search history.

(56) References Cited

U.S. PATENT DOCUMENTS

2020/0076709 A1 *   3/2020   Stenberg ............. H04L 67/1008
2020/0260427 A1 *   8/2020   Schefczik ............. H04W 24/02
(Continued)

FOREIGN PATENT DOCUMENTS

EP          3610670 B1 *   9/2021   ............. H04L 47/70
EP          3907933 A1 *   11/2021   ......... H04L 41/0897
(Continued)

OTHER PUBLICATIONS

S. Kukliński and L. Tomaszewski, "Key Performance Indicators for 5G network slicing," 2019 IEEE Conference on Network Softwarization (NetSoft), Paris, France, 2019, pp. 464-471. (Year: 2019).*
(Continued)

*Primary Examiner* — Thai Dinh Hoang

(57)          ABSTRACT
A system described herein may identify Key Performance Indicators ("KPIs") associated with User Equipment ("UEs") that are connected to a radio access network ("RAN"). Each KPI may be associated with wireless communications between a respective UE and the RAN. The system may identify a plurality of service categories associated with the plurality of UEs, where each particular UE is associated with a respective service category. The system may determine, based on the KPIs and the service category associated with each UE of the plurality of UEs, a radio resource partitioning configuration for the RAN. The particular radio resource partitioning configuration may specify that different portions of a set of radio resources, implemented by the RAN, are associated with different network slices. The RAN may implement the radio resource partitioning configuration by sending and receiving traffic, associated with respective network slices, via a corresponding portion of the set of radio resources.

20 Claims, 11 Drawing Sheets

(51) Int. Cl.
| | |
|---|---|
| *H04B 17/336* | (2015.01) |
| *H04W 16/04* | (2009.01) |
| *H04W 24/10* | (2009.01) |

(56) References Cited

U.S. PATENT DOCUMENTS

| | | | | |
|---|---|---|---|---|
| 2020/0313985 A1* | 10/2020 | Jayakumar | ............ | H04L 41/149 |
| 2022/0329995 A1* | 10/2022 | Venkata | ................... | H04W 4/50 |
| 2025/0240630 A1* | 7/2025 | Yang | .................... | H04B 17/328 |

FOREIGN PATENT DOCUMENTS

| | | | | | |
|---|---|---|---|---|---|
| EP | 4160952 A1 | * | 4/2023 | ............ | H04W 24/02 |
| WO | WO-2018170922 A1 | * | 9/2018 | .......... | H04W 68/005 |
| WO | WO-2021136578 A1 | * | 7/2021 | ........ | H04W 72/1263 |
| WO | WO-2022197218 A1 | * | 9/2022 | ............ | G06N 20/00 |
| WO | WO-2024075130 A1 | * | 4/2024 | ........ | H04L 41/5009 |

OTHER PUBLICATIONS

S. Patro, H. K. Rath and B. Panigrahi, "Dynamic KPI-Aware Network Slicing for 5G+ Networks," 2024 IEEE 13th International Conference on Communication Systems and Network Technologies (CSNT), Jabalpur, India, 2024, pp. 94-99. (Year: 2024).*

S. Mhatre, F. Adelantado, K. Ramantas and C. Verikoukis, "Enhancing AI Transparency: XRL-Based Resource Management and RAN Slicing for 6G O-RAN Architecture," ICC 2025—IEEE International Conference on Communications, Montreal, QC, Canada, 2025, pp. 5755-5760. (Year: 2025).*

S. Mhatre, F. Adelantado, K. Ramantas and C. Verikoukis, "Intelligent QoS-Aware Slice Resource Allocation With User Association Parameterization for Beyond 5G O-RAN-Based Architecture Using DRL," in IEEE Transactions on Vehicular Technology, vol. 74, No. 2, pp. 3096-3109, Feb. 2025. (Year: 2025).*

* cited by examiner

500

502 — Identify radio and/or traffic KPIs associated with UEs connected to RAN

504 — Identify service categories associated with UEs connected to RAN

506 — Determine radio resource partitioning configuration based on radio/traffic KPIs and UE service categories 508 — Implement radio resource partitioning configuration and/ or admission control at RAN

1000

Bus
1010

SYSTEMS AND METHODS FOR RADIO RESOURCE PARTITIONING AND ADMISSION CONTROL FOR A RADIO ACCESS NETWORK BASED ON PER-USER EQUIPMENT FACTORS

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may include a radio access network ("RAN") that serves as a wireless interface between UEs and one or more other devices or networks (e.g., the Internet).

DETAILED DESCRIPTION OF EXAMPLE EMBODIMENTS

Figure 1A:
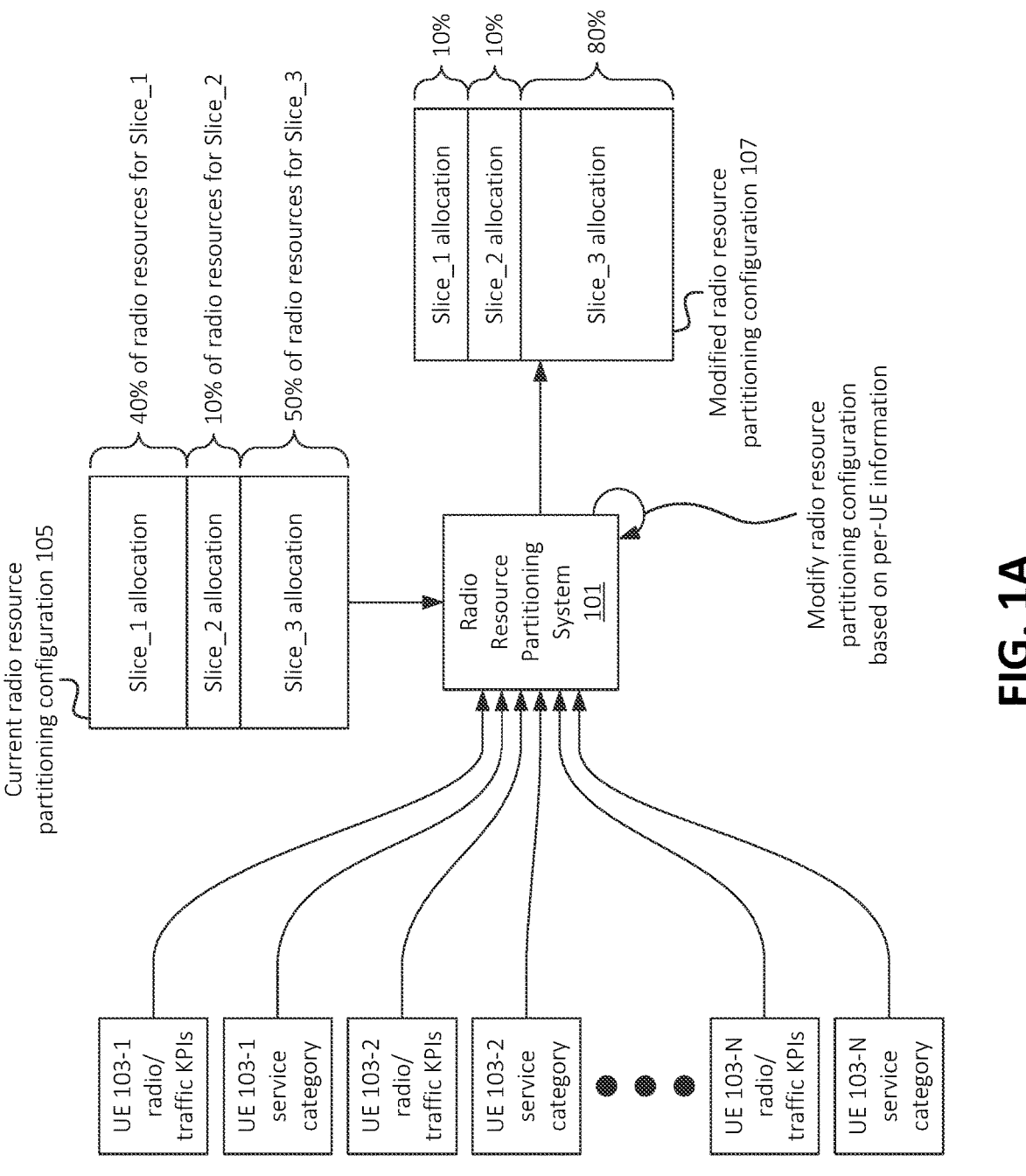
FIGS. 1A and 1B illustrate an example of determining a modified radio resource partitioning configuration for a RAN based on per-UE information, in accordance with some embodiments.

The following detailed description refers to the accompanying drawings. The same reference numbers in different drawings may identify the same or similar elements.

A RAN of a wireless network may serve as an interface between UEs and other elements of the wireless network, such as edge computing devices or a core network of the network (e.g., where the core network provides further routing or connectivity with one or more other networks such as the Internet). Communications between UEs and the wireless network (e.g., where such communications may traverse the RAN of the wireless network) may be associated with different network slices, where particular network slices are implemented by a discrete set of resources of the wireless network and/or are otherwise associated with differentiated Quality of Service ("QoS") parameters and/or performance thresholds. For example, one network slice may be associated with ultra-low latency services, another network slice may be associated with "best effort" services, another network slice may be associated with first responder or emergency services, etc.

RANs may have finite radio resources available, where such radio resources may be represented in the time and frequency domains (e.g., Physical Resource Blocks ("PRBs"). In some embodiments, different proportions or the radio resources may be partitioned, allocated, apportioned, etc. such that some radio resources are allocated for traffic that is associated with a first network slice (or set of network slices), and that other radio resources are allocated for traffic that is associated with a second network slice (or set of network slices). Such partitioning may serve as a mechanism to facilitate load management of UEs receiving service via a given slice, thereby facilitating delivery of QoS parameters, Service Level Agreements ("SLAs"), performance thresholds, etc. associated with the given slice. "Partitions" of radio resources of a RAN, as discussed herein, may refer to particular frequencies, frequency bands, sub-bands, carriers, sub-carriers, or other portions of the radio frequency ("RF") spectrum (e.g., in the frequency domain). In some embodiments, partitions of the radio resources may refer to portions of the RF spectrum in the time domain, or in the time and frequency domains.

Embodiments described herein provide for a dynamic modification of radio resource partitioning configurations for a RAN. As discussed herein, the radio resource partitioning of the RAN may be configured differently under different conditions and/or based on different factors, specific to UEs connected to the RAN, into account when configuring radio resource partitioning of the RAN. Such factors may include radio-related Key Performance Indicators ("KPIs") such as channel quality, signal strength, etc. between each individual UE and the RAN. In some embodiments, the UE-specific factors may include types of traffic or services (e.g., voice call traffic, gaming traffic, content streaming traffic, autonomous vehicle control traffic, etc.) sent to or from such UEs via the RAN. In some embodiments, the UE-specific factors may include categories or types associated with such UEs (e.g., device type such as mobile phone or IoT device, device or user category such as "first responder," "enterprise," etc.). In some embodiments, the UE-specific factors may include traffic QoS attributes, such as network slice (e.g., Network Slice Selection Assistance Information ("NSSAI") values), QoS Class Identifier ("QCI") values, 5G QOS Identifier ("5QI") values, or other suitable QoS attributes of traffic to be sent via the RAN.

In this manner, radio resources of the RAN may be allocated such that factors specific to each UE are taken into account. For example, particular partitions of the RF spectrum, as implemented by the RAN, may be reserved or allocated for traffic associated with particular network slices or other suitable attributes. Such allocations may provide for the ability to account for UE-specific network conditions that would potentially disrupt services provided to particular UEs via particular partitions of the radio spectrum. For example, if a relatively high amount of demand is identified with respect to a particular network slice (e.g., a relatively large quantity of traffic being sent or received by multiple UEs via the RAN where such traffic is associated with a particular network slice), a portion of the RF spectrum that is allocated for that network slice may be increased, in order to account for the relatively high demand. Further, in situations where UEs that are sending or receiving traffic via a given slice are experiencing relatively poor radio conditions (e.g., low signal strength, low channel quality, etc.), a proportion of RF resources of the RAN that is allocated for the given slice may be increased, in order to account for the relatively poor radio conditions. Because per-UE information is taken into account, the adjusting of RF resource allocations, in accordance with embodiments described herein, may be performed in a manner that optimizes the delivery of services both to individual UEs and to the RAN as a whole.

As shown in FIG. 1A, RAN Resource Partitioning System ("RSS") 101 may receive UE-specific information associated with one or more UEs 103 that are connected to a RAN of a wireless network. The UE-specific information may include, for each UE 103, factors such as radio and/or traffic KPIs and service category information. The radio and/or traffic KPIs may include, for each UE 103, information such as Received Signal Strength Indicator ("RSSI") values, Signal-to-Interference-and-Noise-Ratio ("SINR") values, Reference Signal Received Quality ("RSRQ") values, Reference Signal Received Power ("RSRP") values, Channel Quality Indicator ("CQI") values, and/or other suitable values.

Additionally, or alternatively, the radio and/or traffic KPIs may include, for each UE 103, performance metrics over one or more time frames, such as peak performance values in a given time frame, minimum performance values in a given time period, average performance values in a given time period, etc. The performance values may include, for example, latency values, throughput values, jitter values, packet error or loss rate values, or other suitable performance metrics. In some embodiments, performance metrics may be specified in terms of uplink or downlink communications. For example, performance metrics associated with UE 103-1 may include uplink throughput and latency (e.g., throughput and latency of communications from UE 103-1) and may also include downlink throughput and latency (e.g., throughput and latency of communications to UE 103-1).

In some embodiments, each individual UE 103 may determine and report such values to RRPS 101 and/or to some other suitable device or system that relays the information to RRPS 101. Additionally, or alternatively, a base station of the RAN (e.g., a base station to which UEs 103 are connected) may determine or report one or more of the radio and/or traffic KPIs associated with each UE 103. In this sense, the radio and/or traffic KPIs for each UE 103 may be different, even in situations where UEs 103-1 through 103-N are connected to the same portion of the RAN (e.g., connected to the same cell, the same base station, etc.). For example, UE 103-1 may experience or report a first set of radio and/or traffic KPIs due to being located within a building that is within the service area of a particular base station of the RAN, while UE 103-2 may experience or report a different second set radio and/or traffic KPIs due to being located outdoors while within the service area of the same base station.

In some embodiments, the radio and/or traffic KPIs may include or may be based on actual measured and/or reported values that have occurred in the past. For example, RRPS 101 may receive such information from UEs 103, from a base station to which UEs 103 are connected, and/or some other suitable device or system that measures, monitors, and/or reports such information. Additionally, or alternatively, some or all of the radio and/or traffic KPIs may include predicted or simulated values, such as KPIs generated using artificial intelligence/machine learning ("AI/ML") techniques or other suitable techniques. For example, such radio and/or traffic KPIs may reflect trends that are exhibited on a repeating or otherwise predictable basis (e.g., daily trends, weekly trends, seasonal trends, event-based trends, etc.).

UE service categories may include labels, indexes, or other identifiers with which individual UEs 103 are associated, and/or with which traffic sent or received by UEs 103 are associated. For example, a particular service category may be based on a group to which a particular UE 103 belongs (e.g., "first responder," "enterprise," etc.). As another example, a particular service category may be based on a device type of UE 103 (e.g., mobile telephone, IoT device, tablet device, etc.). As yet another example, a particular service category may be based on a type of traffic sent or received by UE 103 (e.g., voice call traffic, gaming traffic, etc.). As another example, a particular service category may be based on QoS information associated with traffic sent or received by UEs 103 (e.g., NSSAI values, 5QI values, QCI values, etc. included in the traffic).

In some embodiments, RRPS 101 may receive UE service category information from a network element that maintains or provides UE information, such as a Unified Data Management function ("UDM"), a Unified Data Repository ("UDR"), a Home Subscriber Server ("HSS"), or the like. In some embodiments, RRPS 101 may receive such information via a Network Exposure Function ("NEF"), a Service Capability Exposure Function ("SCEF"), or other suitable communication pathway or interface with one or more network elements (e.g., UDM, UDR, HSS, etc.) that provide the UE service category information. Such network element may indicate, for example, a device type of UE 103, a category or label of UE 103, QOS parameters associated with UE 103, and/or other suitable UE information based on which RRPS 101 may ultimately determine a radio resource partitioning configuration for the RAN.

As another example, RRPS 101 and/or some other suitable device or system may analyze traffic sent to and/or from UEs 103 to identify corresponding UE service category information. For example, header information of such traffic may include information based on which types of traffic or services may be identified. Such header information may include QoS information (e.g., NSSAI values, 5QI values, etc.), protocol information (e.g., indicating protocols, codecs, etc. with which the traffic is associated), endpoint information (e.g., an application server or other device or system with which UE 103 communicates the traffic), and/or other suitable information based on which RRPS 101 may ultimately determine a radio resource partitioning configuration for the RAN.

RRPS 101 may also receive or identify a current radio resource partitioning configuration 105 of the RAN. For example, RRPS 101 may receive such information from a base station of the RAN (e.g., a base station that implements the particular radio resource partitioning configuration 105), from a RAN controller of the RAN, and/or some other suitable device or system that maintains or provides such information. In this example, radio resource partitioning configuration 105 may indicate that a first portion of radio resources of the RAN (e.g., 40% of the RF spectrum implemented by the RAN) is allocated, reserved, etc. for a first network slice (e.g., Slice_1), that a second portion of radio resources of the RAN (e.g., 10% of the RF spectrum implemented by the RAN) is allocated for a second network slice (e.g., Slice_2), and that a third portion of radio resources of the RAN (e.g., 50% of the RF spectrum implemented by the RAN) is allocated for a third network slice (e.g., Slice_3).

Although shown as percentages (e.g., 40%, 10%, and 50%), the allocated portions of the RF spectrum may be designated in some other way, such as by indicating particular frequencies, frequency ranges, bands, sub-bands, etc. with which each particular network slice is associated. Further, in some embodiments, multiple network slices may be associated with the same particular portion of the RF spectrum. Further, while particular portions of the RF spectrum are discussed herein as being assigned for particular network slices, similar concepts may apply to embodiments in which particular portions of the RF spectrum are assigned based on other factors or attributes, such as UE category, traffic or service type (e.g., voice call services, content streaming services, gaming services, etc.), endpoint identifiers or types (e.g., where "endpoints" refer to other devices or systems with which UEs communicate), or other suitable factors or attributes that are identifiable with respect to traffic that is sent or received via the RAN.

Based on receiving per-UE information associated with multiple UEs 103 connected to a RAN (i.e., UEs 103-1 through 103-N, in this example), RRPS 101 may generate modified radio resource partitioning configuration 107. In some embodiments, RRPS 101 may adjust radio resource partitioning configuration 105 based on the received per-UE information in order to generate modified radio resource partitioning configuration 107. In this example, the allocation for Slice_1, as reflected by modified radio resource partitioning configuration 107, has been reduced in relation to the allocation for Slice_1 included in radio resource partitioning configuration 105 (e.g., from 40% to 10%), and the allocation for Slice_3 has been increased in relation to the allocation indicated in radio resource partitioning configuration 105. For example, based on the per-UE information, RRPS 101 may have identified that an increased quantity of UEs 103, that utilize Slice_3, are connected to the RAN. As another example, RRPS 101 may have identified that an increased quantity of UEs 103, that utilize Slice_3, are connected to the RAN.

As another example, RRPS 101 may have identified that UEs 103 that send or receive Slice_3 traffic are exhibiting reduced performance metrics (e.g., latency and/or throughput metrics that do not meet QoS thresholds associated with Slice_3), and/or that UEs 103 that send or receive Slice_1 traffic are exhibiting nominal performance metrics (e.g., latency and/or throughput metrics that meet or exceed QoS thresholds associated with Slice_1). As yet another example, RRPS 101 may have identified that UEs 103 that send or receive Slice_3 traffic are exhibiting reduced radio KPIs (e.g., relatively low SINR values, relatively low RSRP values, etc.), and/or that UEs 103 that send or receive Slice_1 traffic are not exhibiting reduced KPIs. Further, in some embodiments, RRPS 101 may determine that modifying the radio resource partitioning configuration (e.g., in accordance with modified radio resource partitioning configuration 107) may improve overall efficiency, performance, etc. of the RAN and/or of one or more UEs 103 connected to the RAN (e.g., as compared to radio resource partitioning configuration 105).

In some embodiments, RRPS 101 may generate different radio resource allocations for uplink and downlink communications. For example, RRPS 101 may generate a first modified radio resource partitioning configuration 107 for channels (e.g., portions of the RF spectrum) used for uplink communications, and may generate a second modified radio resource partitioning configuration 107 for downlink channels. When generating modified radio resource partitioning configuration 107 (or modified radio resource partitioning configurations 107), RRPS 101 may take into account the service categories and radio/traffic KPIs for each UE 103, in order to optimally deliver a user experience for UEs 103 that is commensurate with services provided to UEs 103 (e.g., to meet QoS thresholds, SLAs, etc. associated with services provided to each UE 103). For example, as discussed above, RRPS 101 may allocate relatively more resources for a network slice when traffic associated with the network slice has QoS requirements that are not being met (or may potentially not be met in the future), and/or when UEs that send and/or receive traffic associated with the network slice experience relatively low radio KPIs (e.g., low SINR, low RSSI, etc.). In this sense, the radio resource allocations may be custom-tailored and granular inasmuch as such allocations may be based on each radio conditions as well as traffic and/or service requirements (e.g., QoS thresholds, SLAs, etc.) of each UE 103 connected to RAN, as well as respective service requirements associated with network slices associated with traffic sent to or received from such UEs 103.

Figure 1B:
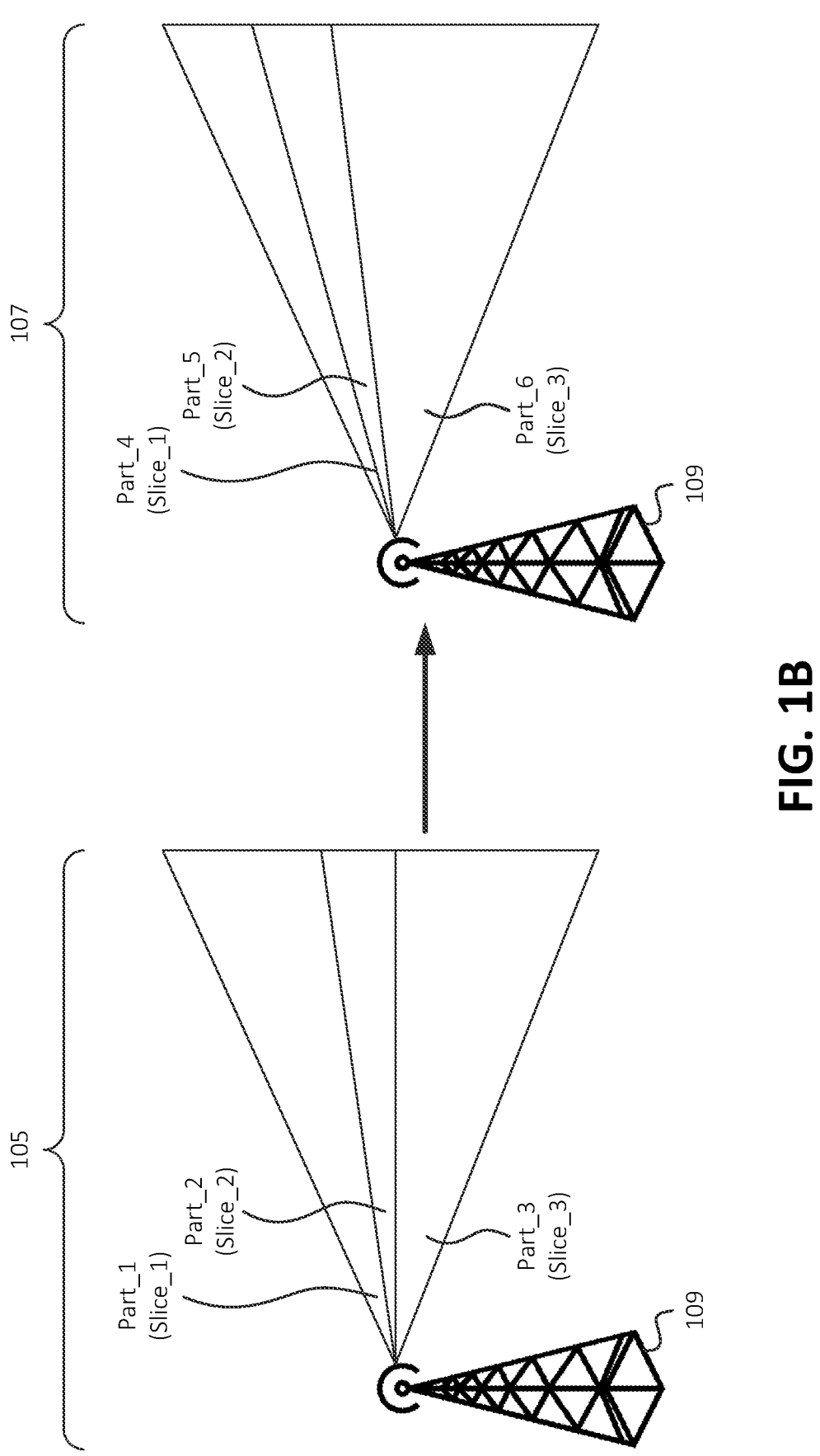

FIG. 1B illustrates an example of radio resource partitioning configuration 105 and modified radio resource partitioning configuration 107 (e.g., as generated based on per-UE information). As shown, base station 109 of a RAN may initially implement radio resource partitioning configuration 105, represented as Part_1, Part_2, and Part_3 (i.e., three example partitions of RF spectrum used by base station 109 to provide wireless connectivity to one or more UEs 103). After modification of radio resource partitioning configuration 105, base station 109 may implement modified radio resource partitioning configuration 107, represented as Part_4, Part_5, and Part_6. Part_1 and Part_4 may be allocated, designated, etc. for Slice_1 traffic, Part_2 and Part_5 may be allocated for Slice_2 traffic, and Part_3 and Part_6 may be allocated for Slice_3 traffic. In this sense, modified radio resource partitioning configuration 107 may include fewer and/or different radio resources (e.g., a narrower or different range of frequencies, sub-bands, etc.) for Slice_1, and additional radio resources for Slice_3 (e.g., a wider or different range of frequencies, sub-bands, etc.) for Slice_3. Further, Part_2 and Part_5 may include the same amount of radio resources (e.g., the same quantity of PRBs, the same frequency width, etc.), but may be different frequencies or sub-bands of the RF spectrum. That is, radio resource partitioning configuration 105 and modified radio resource partitioning configuration 107 may indicate the same amount of radio resources for Slice_2, but the radio resources may be allocated at different frequencies or sub-bands of the RF spectrum in modified radio resource partitioning configuration 107 as compared to radio resource partitioning configuration 105.

Figure 2:
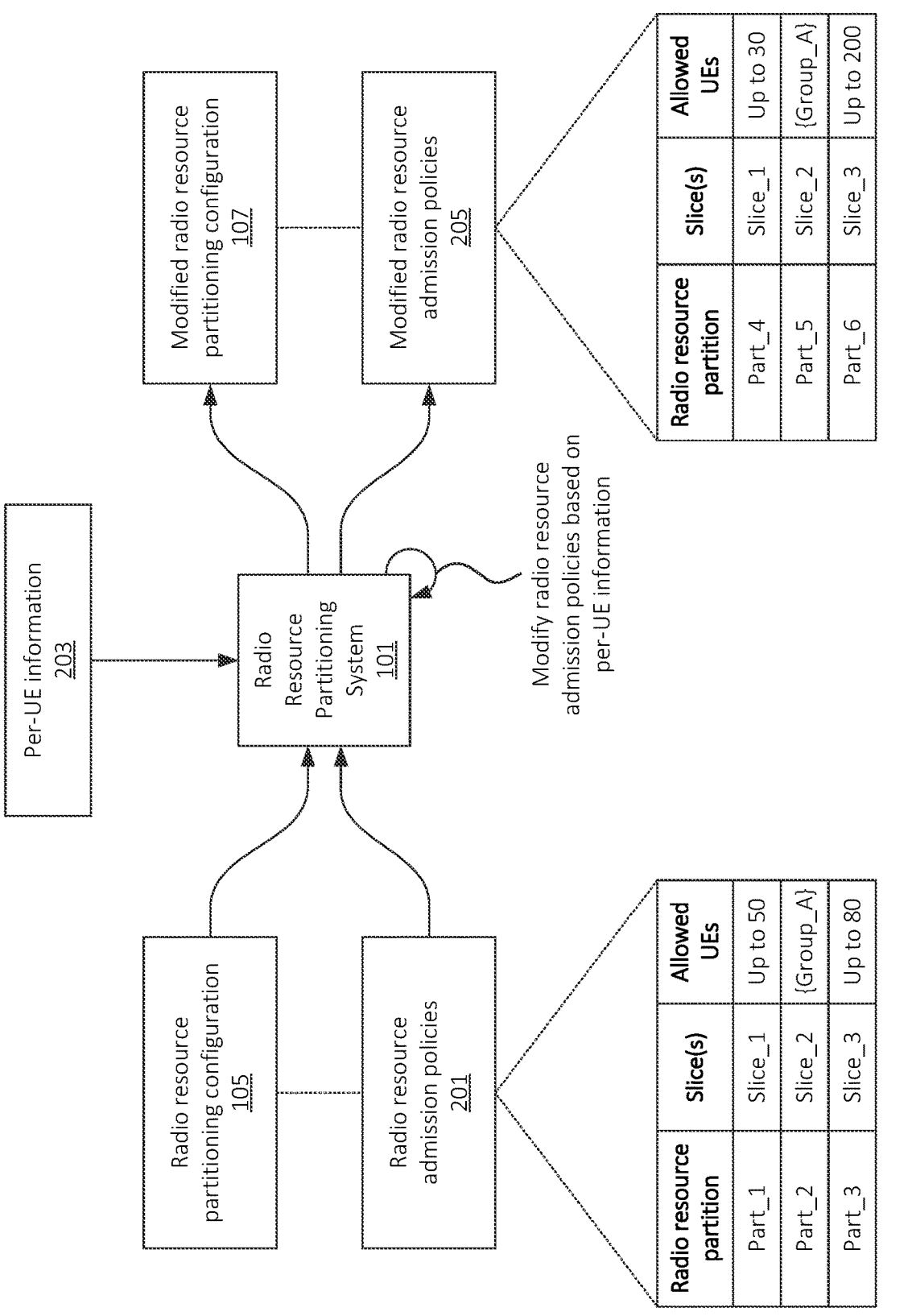
FIG. 2 illustrates and example of determining radio resource partitioning information and/or admission policies for a RAN based on per-UE information, in accordance with some embodiments.

As shown in FIG. 2, RRPS 101 may, in some embodiments, determine a set of admission policies based on modified radio resource partitioning configurations 107 and/or based on the received per-UE information. Admission policies may be used by the RAN to determine whether to grant or deny connection requests from UEs 103 via a given portion of the RF spectrum, and/or whether to grant or deny connection requests from UEs 103 for radio bearers ("RBs") that are associated with a given network slice. Generally, for example, if a particular network slice and/or a portion of the RF spectrum with which the network slice is associated is congested, then the RAN may reject incoming connection requests associated with the particular portion of the RF spectrum and/or the network slice, in order to avoid overloading the portion of the RF spectrum (thereby preserving performance via the network slice for other connected UEs 103).

In some embodiments, RRPS 101 may receive or determine a set of radio resource admission policies 201 that are currently in use by the RAN. In this example, radio resource admission policies 201 may indicate that up to 50 UEs are permitted to access the RAN via a first portion of RF resources of the RAN (e.g., a first frequency band or sub-band, a first set of carriers or sub-carriers, etc.), denoted as Part_1. In some embodiments, radio resource admission policies 201 may indicate that Part_1 is associated with Slice_1. Example radio resource admission policies 201 may further indicate that Part_2 is associated with Slice_2, and that only particular UEs 103 (denoted as {Group_A} are permitted to access the RAN via Part_2. The particular group of UEs 103 may refer to particular UEs 103 (e.g., may include identifiers or identifier ranges of particular UEs 103, such as particular International Mobile Subscriber Identity ("IMSI") values, particular Subscription Permanent Identifier ("SUPI") values, particular Mobile Directory Numbers ("MDNs"), etc.), particular UE types (e.g., mobile phones, IoT devices, etc.), UEs that request to send or receive particular traffic or service types, or other suitable attributes or identifiers of a particular group of UEs 103.

RRPS 101 may identify that radio resource admission policies 201 are in effect, given radio resource partitioning configuration 105. As discussed above, RRPS 101 may further receive per-UE information 203, such as UE radio and/or traffic KPIs, UE service categories, etc. RRPS 101 may generate modified radio resource partitioning configuration 107 and/or modified radio resource admission policies 205 based on radio resource partitioning configuration 105, radio resource admission policies 201, and/or per-UE information 203. For example, RRPS 101 may utilize artificial intelligence/machine learning ("AI/ML") techniques or other suitable techniques to determine that modified radio resource partitioning configuration 107 and/or modified radio resource admission policies 205 will, or are likely to, improve the performance of the RAN and/or some or all of UEs 103 that are connected to the RAN (e.g., reduce congestion associated with one or more network slices, ensure delivery of particular QoS parameters or SLAs associated with particular network slices, etc.).

In this example, modified radio resource admission policies 205 may include a modification to the quantity of allowed UEs via Part_1 and/or Slice_1 (e.g., up to 30, as opposed to radio resource admission policies 201 which specified up to 50 permitted UEs 103). For example, the reduced maximum quantity of connected UEs 103 may be based on a reduction of an amount of RF spectrum allocated for Slice_1 (e.g., a reduction in Part_1) in modified radio resource partitioning configuration 107 as compared to radio resource partitioning configuration 105. Additionally, or alternatively, the reduced maximum quantity of connected UEs 103 via Slice_1 may be based on a determination that traffic and/or performance KPIs of UEs 103, currently connected via Slice_1 (e.g., via the specific portion of RF spectrum allocated for Slice_1), is below one or more QoS thresholds associated with Slice_1. Additionally, or alternatively, the reduced maximum quantity of connected UEs 103 via Slice_1 may be based on a determination of reduced demand for connections via Slice_1. For example, the portion of RF spectrum allocated for Slice_1 may have excess unused resources, which may be allocated for other network slices (e.g., Slice_3) in order to improve performance of traffic associated with such network slices without negatively impacting (or without significantly negatively impacting) traffic associated with Slice_1.

As further shown, modified radio resource admission policies 205 may include an increase to the maximum quantity of UEs permitted to be connected via Slice_3 (e.g., via Part_6 that is allocated for Slice_3 communications). For example, Part_6 may include more radio resources than Part_3. As another example, per-UE KPIs associated with UEs 103 communicating with the RAN via Part_3 and/or slice_3 may be above one or more thresholds (e.g., latency and/or throughput thresholds), and modified radio resource admission policies 205 may include an increase to the quantity of permitted UEs 103 in order to increase RAN capacity for communications associated with Slice_3 communications.

In some embodiments, RRPS 101 may generate, receive, maintain, refine, etc. one or more models (e.g., AI/ML models) or other suitable associations between respective radio resource admission policies and radio resource partitioning configurations. For example, RRPS 101 may maintain information associating radio resource admission policies 201 with radio resource partitioning configuration 105, and associating modified radio resource admission policies 205 with modified radio resource partitioning configuration 107. Thus, when identifying that modified radio resource partitioning configuration 107 should be implemented by a RAN, RRPS 101 may identify that modified radio resource admission policies 205 are associated with modified radio resource partitioning configuration 107, and the RAN should in turn implement modified radio resource admission policies 205 based on implementing modified radio resource partitioning configuration 107. Additionally, or alternatively, RRPS 101 may determine or identify that modified radio resource admission policies 205 should be implemented, when implementing modified radio resource partitioning configuration 107, based on some other suitable mechanism or procedure. In some embodiments, RRPS 101 may determine that implementing modified radio resource partitioning configuration 107 and modified radio resource admission policies 205, together, would improve operation of the RAN and/or of UEs 103 connected to the RAN. For example, RRPS 101 may determine that RAN efficiency, reliability, capacity, and/or performance may be improved, and/or that performance of particular traffic (e.g., traffic sent between the RAN and individual UEs 103, traffic associated with particular traffic or service types, etc.) may be improved by implementing modified radio resource partitioning configuration 107 and modified radio resource admission policies 205.

Figure 3:
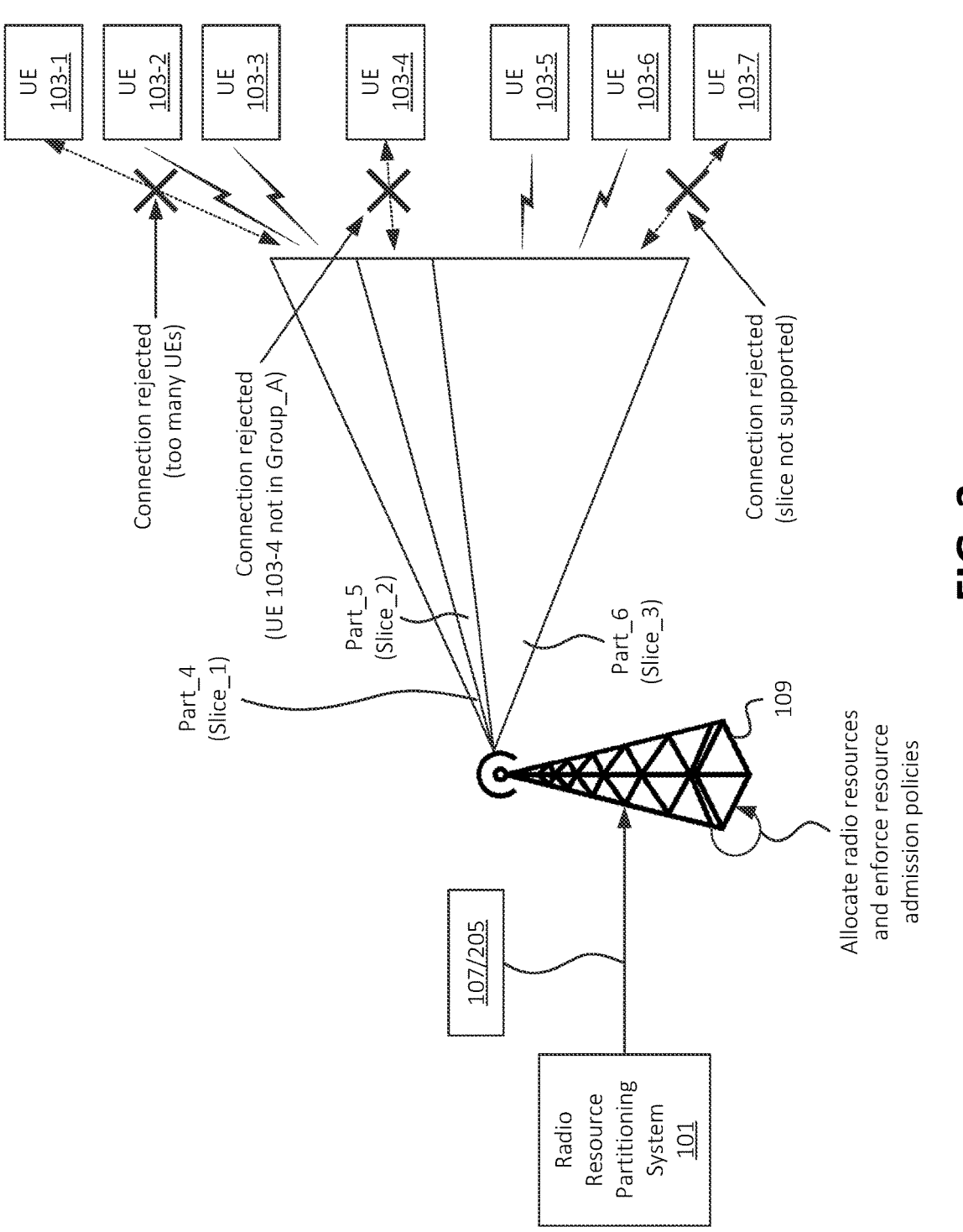
FIG. 3 illustrates an example of implementing radio resource partitioning information and/or admission policies at a RAN, in accordance with some embodiments.

FIG. 3 illustrates an example of implementing modified radio resource partitioning configuration 107 and/or modified radio resource admission policies 205, in accordance with some embodiments. As shown, RRPS 101 may provide a particular modified radio resource partitioning configuration 107 and modified radio resource admission policies 205 to a particular base station 109 of a RAN, such as based on receiving per-UE KPIs of UEs 103 connected to base station 109, RAN configuration information (e.g., RATs or bands implemented by base station 109), RAN KPIs (e.g., radio resource capacity, radio resource utilization, etc.), and/or other suitable information associated with base station 109 and/or UEs 103 connected to base station 109.

As similarly noted above with respect to FIG. 1B, implementing modified radio resource partitioning configuration 107 may include allocating portions of the RF spectrum for particular network slices. For example, Part_4 may be allocated for Slice_1, Part_5 may be allocated for Slice_2, and Part_6 may be allocated for Slice_3. Further, implementing modified radio resource admission policies 205 may include selectively accepting or rejecting connection requests from UEs 103 based on particular criteria, conditions, etc. specified in modified radio resource admission policies 205. Additionally, or alternatively, implementing modified radio resource admission policies 205 may include disconnecting, terminating, dropping, etc. connected UEs 103 in certain situations, such as disconnecting an existing connection with a particular UE 103 if more than a threshold quantities of UEs 103 are connected to base station 109 via a particular network slice.

For example, as shown, UE 103-1 may attempt to connect to base station 109 via Slice_1. For example, UE 103-1 may output a connection or attachment request that includes an NSSAI value or other suitable indicator of Slice_1. Base station 109 may identify, based on modified radio resource admission policies 205, that the connection request should be rejected. For example, base station 109 may identify that more than a threshold quantity (e.g., as indicated in modified radio resource admission policies 205) of UEs 103 are connected to base station 109 via Slice_1 (e.g., including UEs 103-2 and 103-3), and that accepting the connection request from UE 103-1 would violate modified radio resource admission policies 205 (e.g., a threshold quantity of UEs specified in modified radio resource admission policies 205 may be exceeded if the connection request from UE 103-1 were accepted). Additionally, or alternatively, base station 109 may identify that a capacity of Part_4 (e.g., an amount of radio resources available in Part_4), with which the requested Slice_1 is associated, is below a threshold, or that accepting the connection request from UE 103-1 would overload radio resources of Part_4 or would cause performance of Slice_1 traffic to fall below performance thresholds associated with Slice_1.

As another example, base station 109 may selectively permit connections based on category, group, type, or attributes of particular UEs 103. For example, base station 109 may reject a connection request from UE 103-4 based on identifying that UE 103-4 is not a group associated with a particular slice (e.g., is not in {Group_A} associated with Slice_2). As discussed above, modified radio resource admission policies 205 may indicate that only UEs 103 belonging to {Group_A} (e.g., where {Group_A} specifies particular UE identifiers, UE attributes, UE device types, etc.) are permitted to communicate Slice_2 traffic with base station 109. In this example, UE 103-4 may output a connection request (e.g., a radio bearer establishment request) that indicates that the requested connection is associated with Slice_2 and that further includes an identifier of UE 103-4 and/or other suitable information based on which base station 109 may identify whether UE 103-4 is in {Group_A}. Base station 109 may identify (e.g., based on the information included in the request) that UE 103-4 is not in {Group_A}, and may therefore reject the connection request.

Base station 109 may further reject connections from UEs 103 that indicate a particular RAT, band, sub-band, etc. that is not associated with a particular slice, as indicted in modified radio resource partitioning configuration 107. For example, UE 103-7 may request a connection to base station 109 via Part_6 (e.g., may indicate a particular RAT, subband, etc. with which Part_6 is associated), and may further specify a particular network slice with which the request is associated. In this example, base station 109 may reject the connection request from UE 103-7, as Part_6 is not associated the requested network slice.

As discussed above, base station 109 may disconnect, terminate, etc. active connections based on modified radio resource admission policies 205. For example, UEs 103 that are connected to base station 109 (e.g., which have been admitted based on previous radio resource partitioning configuration 105 and/or radio resource admission policies 201), may be disconnected by base station 109 such that modified radio resource partitioning configuration 107 and/or modified radio resource admission policies 205 are satisfied. When disconnecting active UEs 103 in such a manner, base station 109 may disconnect the oldest connections, the connections via which the least amount of traffic has been transmitted, and/or may utilize some other suitable mechanism or technique for disconnecting active UEs 103.

Further, when rejecting connection requests or disconnecting UEs 103, base station 109 may indicate a reason or cause that connection requests have been rejected or that UEs 103 have been disconnected. For example, base station 109 may utilize Radio Resource Control ("RRC") signaling or other suitable messaging to indicate, to UE 103-1, that Slice_1 and/or Part_4 are overloaded or are at capacity. Similarly, base station 109 may indicate, to UE 103-4, that UE 103-4 is not in a group of UEs that are permitted to access Slice_2 and/or Part_5. Additionally, base station 109 may indicate, to UE 103-7, that a requested network slice and a requested portion of the RF spectrum (e.g., particular RATs, bands, sub-bands, etc.) are not permitted as per modified radio resource partitioning configuration 107 and/or modified radio resource admission policies 205. Providing such information to UEs 103 may facilitate UEs 103 attempting alternate mechanisms to connect to base station 109 (e.g., via different network slices and/or portions of the RF spectrum). In this manner, UEs 103 may still receive wireless connectivity from base station 109, as UEs 103 may gain an inference as to why connection requests were rejected and may take remedial measures such as requesting connections to base station 109 via alternate network slices or portions of the RF spectrum.

Figure 4:
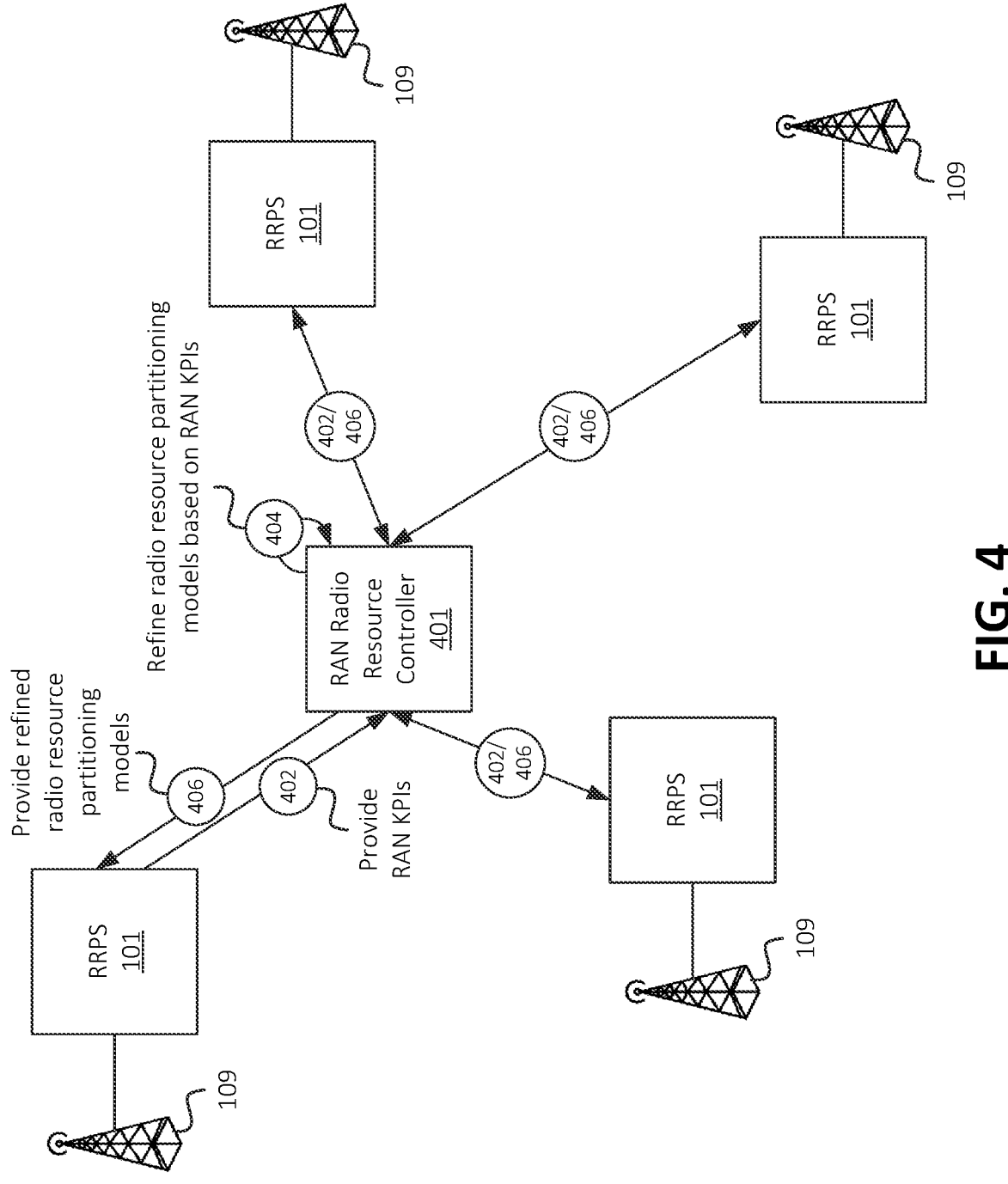
FIG. 4 illustrates an example of configuring radio resource partitioning information and/or admission policies at multiple base stations of a RAN, in accordance with some embodiments.

As shown in FIG. 4, multiple instances of RRPS 101 may be deployed with respective base stations 109. For example, a first RRPS 101 may be deployed with a first base station 109, a second RRPS 101 may be deployed with a second base station 109, and so on. In some embodiments, each RRPS 101 may be communicatively coupled to a respective base station 109, may be implemented by the same set of hardware resources as a respective base station 109, and/or may otherwise be associated with a respective base station 109. In this manner, each base station 109 may receive UE priority information from a respective RRPS 101, and may schedule traffic to and/or from connected UEs 103 in accordance with such priority information.

Further, in some embodiments, RRPSs 101 may be communicatively coupled to RAN Radio Resource Controller ("RRRC") 401, which may be implemented by or communicatively coupled to a RAN controller associated with base stations 109. The RAN controller may, for example, provide configuration information to base stations 109, such as beamforming parameters, mobility parameters, access parameters, and/or other suitable configuration parameters. In some embodiments, RRPSs 101 may indicate radio resource partitioning configuration information and/or radio resource admission policies to RRRC 401 and/or the RAN controller, which may in turn provide such information to respective base stations 109.

In some embodiments, RRRC 401 may control some or all of the operation of respective RRPSs 101, such as the particular models, algorithms, or other parameters used to determine radio resource partitioning configuration and/or admission information. For example, RRRC 401 may receive (at 402) RAN KPIs from some or all RRPSs 101. The RAN KPIs may include information such as quantity of connected UEs, channel quality information, resource capacity and/or usage information, and/or other suitable RAN KPIs. In some embodiments, RRRC 401 may receive other types of information from one or more other sources, such as UE performance information (e.g., latency KPIs, throughput KPIs, etc.), user satisfaction information (e.g., a score indicating a measure of user satisfaction with UE performance in a given timeframe), and/or other suitable information. RRRC 401 may refine (at 404) models, algorithms, or other parameters used by some or all RRPSs 101 based on the received (at 402) information. For example, RRRC 401 may determine that a set of algorithms, variables, coefficients, etc. used by one or more RRPSs 101 to generate radio resource partitioning configuration and/or admission information yielded a lower measure of performance than a threshold measure of performance, and may generate or identify a modified set of algorithms, variables, coefficients, etc. in order to potentially yield an improved measure of performance. RRRC 401 may propagate (at 406) such refined models to some or all RRPSs 101. In this manner, although each instance of RRPS 101 may determine radio resource partitioning configuration and/or admission information for a particular portion of the RAN (e.g., a particular base station 109), information from all RRPSs 101 may be used to optimize the individual performance of each RRPS 101.

Figure 5:
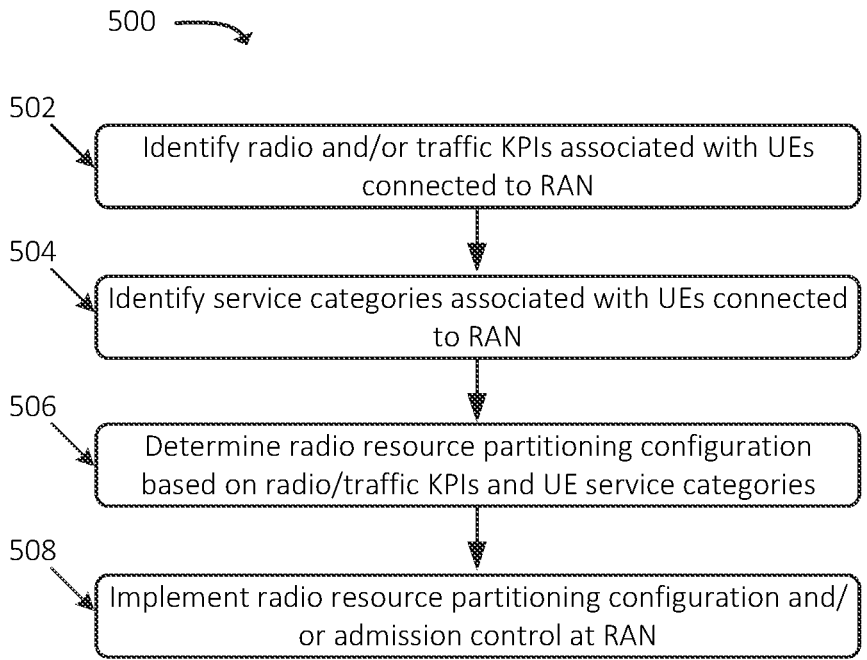
FIG. 5 illustrates an example process for configuring and/or implementing radio resource partitioning information and/or admission policies at a RAN, in accordance with some embodiments.

FIG. 5 illustrates an example process 500 for configuring and/or implementing radio resource partitioning information and/or admission policies at a RAN. In some embodiments, some or all of process 500 may be performed by RRPS 101. In some embodiments, one or more other devices may perform some or all of process 500 in concert with, and/or in lieu of, RRPS 101 (e.g., base station 109 and/or RRRC 401).

As shown, process 500 may include identifying (at 502) radio and/or traffic KPIs associated with UEs 103 that are connected to a particular RAN or a portion thereof. For example, as discussed above, RRPS 101 may identify, for a particular base station, a particular cell, and/or other suitable portion of a RAN of a wireless network, radio and/or traffic KPIs for some or all UEs 103 that are connected to the particular base station, cell, etc. For example, RRPS 101 may receive such information from UEs 103 (e.g., via an application programming interface ("API"), an application executing at UEs 103, etc.), from a particular base station 109 to which UEs 103 are connected, and/or from some other suitable source. As discussed above, the radio and/or traffic KPIs may include measures of signal quality, measures of channel quality, measures of received signal strength, measures of interference or noise, and/or other suitable metrics or values that relate to wireless communications between individual UEs 103 and base station 109. Such metrics or values may include, for example, RSSI values, RSRP values, RSRQ values, SINR values, or the like.

Additionally, or alternatively, the radio and/or traffic KPIs may include performance metrics such as latency or throughput of communications between UEs 103 and base station 109, packet error or loss rate of communications between UEs 103 and base station 109, jitter of communications between UEs 103 and base station 109, and/or other performance metrics. In some embodiments, as discussed above, the identified radio and/or traffic KPIs may include actual values that have been measured or otherwise determined, and/or may include predicted or estimated values generated using AI/ML techniques or other suitable predictive techniques.

Process 500 may further include identifying (at 504) service categories associated with UEs 103 connected to the RAN (e.g., to the same particular base station 109). For example, as discussed above, service categories may include device type (e.g., mobile telephone, tablet, IoT device, etc.), traffic or service type (e.g., voice call traffic, gaming traffic, etc.), QOS information (e.g., network slice of traffic sent to or from UEs 103, 5QI values included in traffic sent to or from UEs 103, etc.), or the like.

Process 500 may additionally include determining (at 506) a radio resource partitioning configuration for the RAN based on the radio and/or traffic KPIs and the service categories for each connected UE 103. For example, as discussed above, RRPS 101 may utilize one or more models, algorithms, etc. (e.g., as provided by RRRC 401 and/or as determined by RRPS 101 or some other suitable device or system) to generate the radio resource partitioning configuration based on the radio and/or traffic KPIs and service categories. As discussed above, the determination of the radio resource partitioning configuration for the RAN may be performed in a manner that accounts for both network conditions unique to each UE 103, as well as the particular QoS or service requirements of each UE 103. As discussed above, the radio resource partitioning configuration may include assigning, associating, etc. particular portions of RF spectrum implemented by the RAN (e.g., bands, sub-bands, frequencies, frequency ranges, carriers, sub-carriers, etc.) for particular respective network slices or sets of network slices. In this manner, the radio resource partitioning configuration (e.g., assignments of particular portions of RF spectrum for use by traffic associated with particular network slices) can be adjusted in a manner that provides a blend of performance and reliability to each UE 103, as well as to all connected UEs 103 as a whole. As discussed above, determining the radio resource partitioning configuration may include determining admission control policies for the RAN. For example, changes to the radio resource partitioning configuration may increase or reduce the capacity of the RAN to send or receive traffic associated with a particular network slice (e.g., resources assigned for the particular network slice may have increased or decreased), and admission control policies may therefore be adjusted to account for the different capacity for handling traffic associated with a given network slice.

Process 500 may also include implementing (at 508) the radio resource partitioning configuration at the RAN. For example, as discussed above, implementing the radio resource partitioning configuration may include allocating, assigning, reserving, etc. particular portions of the RF spectrum (e.g., particular frequencies, bands, sub-bands, etc.) for particular network slices. When scheduling uplink or downlink traffic with connected UEs 103, the RAN (e.g., a particular base station 109 of the RAN) may identify a particular network slice with which the traffic is associated (e.g., by evaluating header information or other suitable information associated with the traffic), and may identify a portion of the RF spectrum with which the network slice is associated (e.g., as indicated by the radio resource partitioning configuration). The RAN may select radio resources, from the identified portion of the RF spectrum with which the network slice is associated, to use in order to wirelessly transmit the traffic. In this sense, the allocation of particular portions of the RF spectrum for particular network slices may serve as a load balancing or congestion management mechanism for the RAN, while also optimizing delivery of traffic in accordance with QoS parameters or SLAs associated with network slices with which the traffic is associated.

As also discussed above, implementing the radio resource partitioning configuration may include, or may occur in conjunction with, implementing admission control mechanisms at the RAN, such as accepting or denying connection requests from UEs 103 to establish radio bearers or otherwise communicate with the RAN. As discussed above, the admission control mechanisms may relate to particular portions of the RF spectrum and/or to particular network slices. The RAN may accept or deny connection requests in situations where UEs 103 request connections to other access to the RAN using such portions of the RF spectrum, and/or where such connections or access are associated with such network slices. Similarly, the RAN may, in some scenarios, disconnect UEs 103 based on the admission control policies (e.g., where a greater quantity of UEs 103, that send or receive traffic associated with a particular network slice, are connected to the RAN than a threshold quantity of allowed UEs 103 for such network slice).

Figure 6:
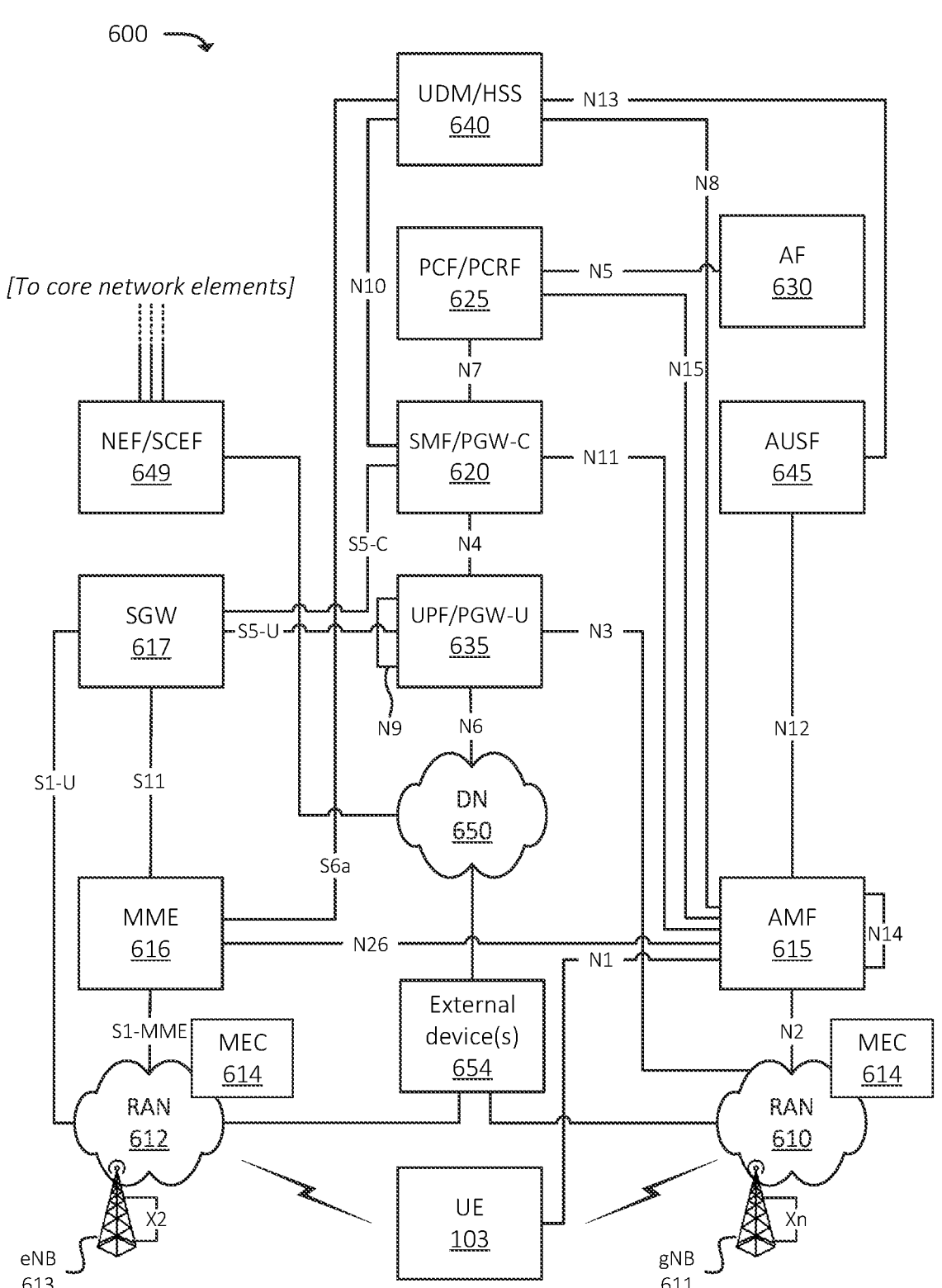
FIGS. 6 and 7 illustrate example environments in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 600 may represent or may include a 5G core ("5GC"). As shown, environment 600 may include UE 103, RAN 610 (which may include one or more Next Generation Node Bs ("gNBs") 611), RAN 612 (which may include one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, UDM/HSS 640, Authentication Server Function ("AUSF") 645, and NEF/SCEF 649. Environment 600 may also include one or more networks, such as Data Network ("DN") 650. Environment 600 may include one or more additional devices or systems communicatively coupled to one or more networks (e.g., DN 650), such as one or more external devices 654.

The example shown in FIG. 6 illustrates one instance of each network component or function (e.g., one instance of SMF/PGW-C 620, PCF/PCRF 625, UPF/PGW-U 635, UDM/HSS 640, and/or AUSF 645). In practice, environment 600 may include multiple instances of such components or functions. For example, in some embodiments, environment 600 may include multiple "slices" of a core network, where each slice includes a discrete and/or logical set of network functions (e.g., one slice may include a first instance of AMF 615, SMF/PGW-C 620, PCF/PCRF 625, and/or UPF/PGW-U 635, while another slice may include a second instance of AMF 615, SMF/PGW-C 620, PCF/PCRF

625, and/or UPF/PGW-U 635). The different slices may provide differentiated levels of service, such as service in accordance with different QoS parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Additionally, one or more elements of environment 600 may be implemented in a virtualized and/or containerized manner. For example, one or more of the elements of environment 600 may be implemented by one or more Virtualized Network Functions ("VNFs"), Cloud-Native Network Functions ("CNFs"), etc. In such embodiments, environment 600 may include, may implement, and/or may be communicatively coupled to an orchestration platform that provisions hardware resources, installs containers or applications, performs load balancing, and/or otherwise manages the deployment of such elements of environment 600. In some embodiments, such orchestration and/or management of such elements of environment 600 may be performed by, or in conjunction with, the open-source Kubernetes® API or some other suitable virtualization, containerization, and/or orchestration system.

Elements of environment 600 may interconnect with each other and/or other devices via wired connections, wireless connections, or a combination of wired and wireless connections. Examples of interfaces or communication pathways between the elements of environment 600, as shown in FIG. 6, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 6, such as Service-Based Interfaces ("SBIs"), including an Namf interface, an Nudm interface, an Npcf interface, an Nupf interface, an Nnef interface, an Nsmf interface, and/or one or more other SBIs.

UE 103 may include a computation and communication device, such as a wireless mobile communication device that is capable of communicating with RAN 610, RAN 612, and/or DN 650. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, an M2M device, or the like), a Fixed Wireless Access ("FWA")

device, or another type of mobile computation and communication device. UE 103 may send traffic to and/or receive traffic (e.g., user plane traffic) from DN 650 via RAN 610, RAN 612, and/or UPF/PGW-U 635.

RAN 610 may be, or may include, a 5G RAN that implements a 5G RAT and includes one or more base stations (e.g., one or more gNBs 611), via which UE 103 may communicate with one or more other elements of environment 600. UE 103 may communicate with RAN 610 via an air interface (e.g., as provided by gNB 611). For instance, RAN 610 may receive traffic (e.g., user plane traffic such as voice call traffic, data traffic, messaging traffic, etc.) from UE 103 via the air interface, and may communicate the traffic to UPF/PGW-U 635 and/or one or more other devices or networks. Further, RAN 610 may receive signaling traffic, control plane traffic, etc. from UE 103 via the air interface, and may communicate such signaling traffic, control plane traffic, etc. to AMF 615 and/or one or more other devices or networks. Additionally, RAN 610 may receive traffic intended for UE 103 (e.g., from UPF/PGW-U 635, AMF 615, and/or one or more other devices or networks) and may communicate the traffic to UE 103 via the air interface. In some embodiments, base station 109 may be, may include, and/or may be implemented by one or more gNBs 611.

RAN 612 may be, or may include, an LTE RAN that implements an LTE RAT and includes one or more base stations (e.g., one or more eNBs 613), via which UE 103 may communicate with one or more other elements of environment 600. UE 103 may communicate with RAN 612 via an air interface (e.g., as provided by eNB 613). For instance, RAN 612 may receive traffic (e.g., user plane traffic such as voice call traffic, data traffic, messaging traffic, signaling traffic, etc.) from UE 103 via the air interface, and may communicate the traffic to UPF/PGW-U 635 (e.g., via SGW 617) and/or one or more other devices or networks. Further, RAN 612 may receive signaling traffic, control plane traffic, etc. from UE 103 via the air interface, and may communicate such signaling traffic, control plane traffic, etc. to MME 616 and/or one or more other devices or networks. Additionally, RAN 612 may receive traffic intended for UE 103 (e.g., from UPF/PGW-U 635, MME 616, SGW 617, and/or one or more other devices or networks) and may communicate the traffic to UE 103 via the air interface. In some embodiments, base station 109 may be, may include, and/or may be implemented by one or more eNBs 613.

One or more RANs of environment 600 (e.g., RAN 610 and/or RAN 612) may include, may implement, and/or may otherwise be communicatively coupled to one or more edge computing devices, such as one or more Multi-Access/ Mobile Edge Computing ("MEC") devices (referred to sometimes herein simply as a "MECs") 614. MECs 614 may be co-located with wireless network infrastructure equipment of RANs 610 and/or 612 (e.g., one or more gNBs 611 and/or one or more eNBs 613, respectively). Additionally, or alternatively, MECs 614 may otherwise be associated with geographical regions (e.g., coverage areas) of wireless network infrastructure equipment of RANs 610 and/or 612. In some embodiments, one or more MECs 614 may be implemented by the same set of hardware resources, the same set of devices, etc. that implement wireless network infrastructure equipment of RANs 610 and/or 612. In some embodiments, one or more MECs 614 may be implemented by different hardware resources, a different set of devices, etc. from hardware resources or devices that implement wireless network infrastructure equipment of RANs 610 and/or 612. In some embodiments, MECs 614 may be communicatively coupled to wireless network infrastructure equipment of RANs 610 and/or 612 (e.g., via a high-speed and/or low-latency link such as a physical wired interface, a high-speed and/or low-latency wireless interface, or some other suitable communication pathway).

MECs 614 may include hardware resources (e.g., configurable or provisionable hardware resources) that may be configured to provide services and/or otherwise process traffic to and/or from UE 103, via RAN 610 and/or 612. For example, RAN 610 and/or 612 may route some traffic from UE 103 (e.g., traffic associated with one or more particular services, applications, application types, etc.) to a respective MEC 614 instead of to core network elements of 600 (e.g., UPF/PGW-U 635). MEC 614 may accordingly provide services to UE 103 by processing such traffic, performing one or more computations based on the received traffic, and providing traffic to UE 103 via RAN 610 and/or 612. MEC 614 may include, and/or may implement, some or all of the functionality described above with respect to RRPS 101, RRRC 401, UPF/PGW-U 635, AF 630, one or more application servers, and/or one or more other devices, systems, VNFs, CNFs, etc. In this manner, ultra-low latency services may be provided to UE 103, as traffic does not need to traverse links (e.g., backhaul links) between RAN 610 and/or 612 and the core network.

AMF 615 may include one or more devices, systems, VNFs, CNFs, etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, CNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 103. In some embodiments, the establishment of communications sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, CNFs, etc., that receive, store, and/or provide information that may be used in determining parameters (e.g., quality of service parameters, charging parameters, or the like) for certain applications.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 103, from DN 650, and may forward the user plane data toward UE 103 (e.g., via RAN 610, SMF/PGW-C 620, and/or one or more other devices). In some embodiments, multiple instances of UPF/PGW-U 635 may be deployed (e.g., in different geographical locations), and the delivery of content to UE 103 may be coordinated via the N9 interface (e.g., as denoted in FIG. 6 by the line marked "N9" originating and terminating at UPF/PGW-U 635). Similarly, UPF/PGW-U 635 may receive traffic from UE 103 (e.g., via RAN 610, RAN 612, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

UDM/HSS 640 and AUSF 645 may include one or more devices, systems, VNFs, CNFs, etc., that manage, update, and/or store, in one or more memory devices associated with AUSF 645 and/or UDM/HSS 640, profile information associated with a subscriber. In some embodiments, UDM/HSS 640 may include, may implement, may be communicatively coupled to, and/or may otherwise be associated with some other type of repository or database, such as a UDR. AUSF 645 and/or UDM/HSS 640 may perform authentication, authorization, and/or accounting operations associated with one or more UEs 103 and/or one or more communication sessions associated with one or more UEs 103.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 103 may communicate, through DN 650, with data servers, other UEs 103, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 103 may communicate.

External devices 654 may include one or more devices or systems that communicate with UE 103 via DN 650 and one or more elements of 600 (e.g., via UPF/PGW-U 635). External devices 654 may include, for example, one or more application servers, content provider systems, web servers, or the like. External devices 654 may, for example, implement "server-side" applications that communicate with "client-side" applications executed by UE 103. External devices 654 may provide services to UE 103 such as gaming services, videoconferencing services, messaging services, email services, web services, and/or other types of services. In some embodiments, external devices 654 may communicate with one or more elements of environment 600 (e.g., core network elements) via NEF/SCEF 649. NEF/SCEF 649 include one or more devices, systems, VNFs, CNFs, etc. that provide access to information, APIs, and/or other operations or mechanisms of one or more core network elements to devices or systems that are external to the core network (e.g., to external device 654 via DN 650). NEF/SCEF 649 may maintain authorization and/or authentication information associated with such external devices or systems, such that NEF/SCEF 649 is able to provide information, that is authorized to be provided, to the external devices or systems. For example, a given external device 654 may request particular information associated with one or more core network elements. NEF/SCEF 649 may authenticate the request and/or otherwise verify that external device 654 is authorized to receive the information, and may request, obtain, or otherwise receive the information from the one or more core network elements. In some embodiments, NEF/SCEF 649 may include, may implement, may be implemented by, may be communicatively coupled to, and/or may otherwise be associated with a Security Edge Protection Proxy ("SEPP"), which may perform some or all of the functions discussed above. External device 654 may, in some situations, subscribe to particular types of requested information provided by the one or more core network elements, and the one or more core network elements may provide (e.g., "push") the requested information to NEF/SCEF 649 (e.g., in a periodic or otherwise ongoing basis).

In some embodiments, external devices 654 may communicate with one or more elements of RAN 610 and/or 612 via an API or other suitable interface. For example, a given external device 654 may provide instructions, requests, etc. to RAN 610 and/or 612 to provide one or more services via one or more respective MECs 614. In some embodiments, such instructions, requests, etc. may include QOS parameters, Service Level Agreements ("SLAs"), etc. (e.g., maximum latency thresholds, minimum throughput thresholds, etc.) associated with the services.

Figure 7:
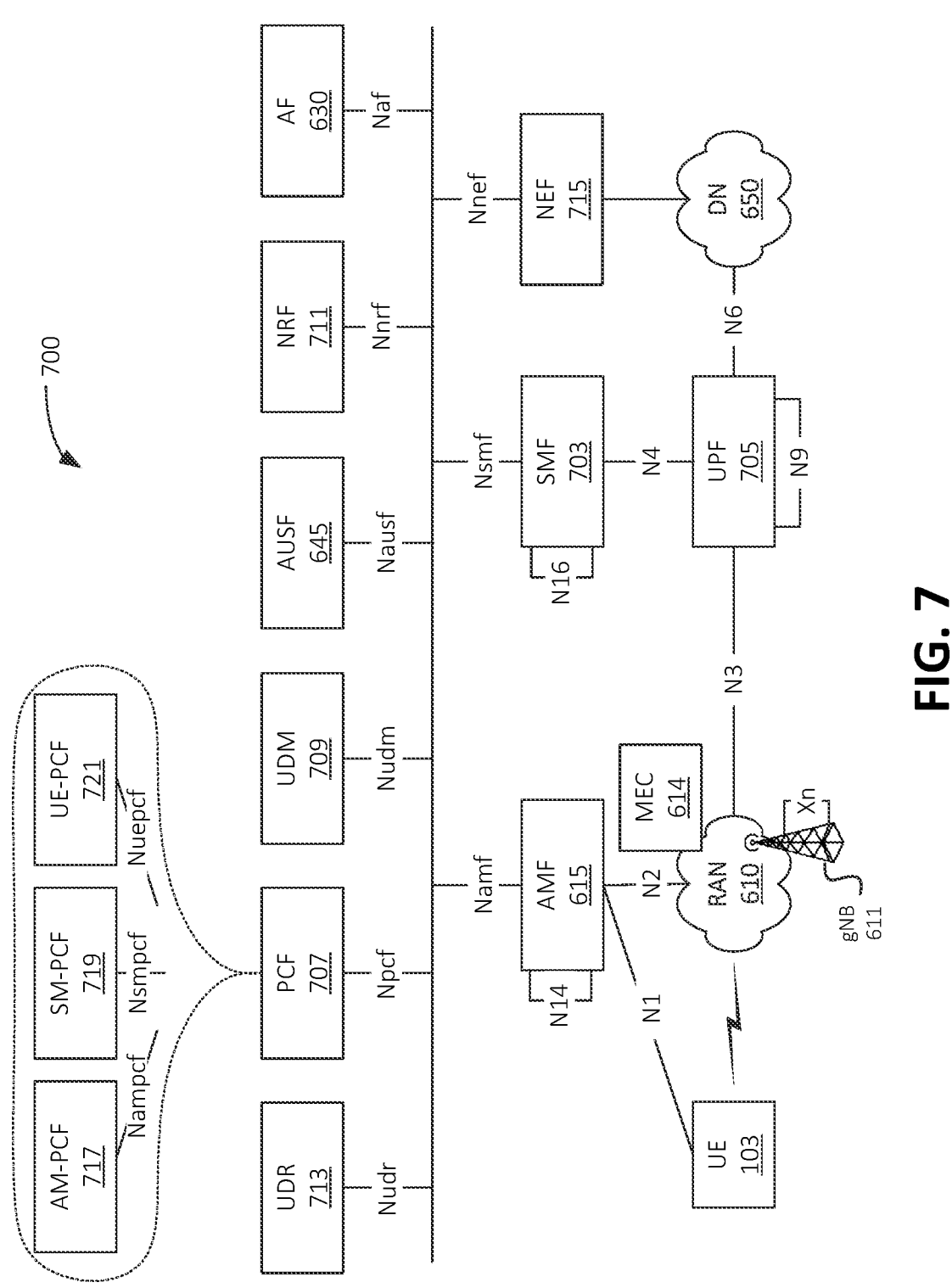

FIG. 7 illustrates another example environment 700, in which one or more embodiments may be implemented. In some embodiments, environment 700 may correspond to a 5G network, and/or may include elements of a 5G network. In some embodiments, environment 700 may correspond to a 5G SA architecture. In some embodiments, environment 700 may include a 5GC, in which 5GC network elements perform one or more operations described herein.

As shown, environment 700 may include UE 103, RAN 610 (which may include one or more gNBs 611 or other types of wireless network infrastructure) and various network functions, which may be implemented as VNFs, CNFs, etc. Such network functions may include AMF 615, SMF 703, UPF 705, PCF 707, UDM 709, AUSF 645, Network Repository Function ("NRF") 711, AF 630, UDR 713, and NEF 715. Environment 700 may also include or may be communicatively coupled to one or more networks, such as DN 650.

The example shown in FIG. 7 illustrates one instance of each network component or function (e.g., one instance of SMF 703, UPF 705, PCF 707, UDM 709, AUSF 645, etc.). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF 703, PCF 707, UPF 705, etc., while another slice may include a second instance of SMF 703, PCF 707, UPF 705, etc.). Additionally, or alternatively, one or more of the network functions of environment 700 may implement multiple network slices.

The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include interfaces shown in FIG. 7 and/or one or more interfaces not explicitly shown in FIG. 7. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 700 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 615), an Nudm interface (e.g., indicating communications to be routed to UDM 709), an Npcf interface, an Nupf interface, an Nnef interface, an Nsmf interface, an Nnrf interface, an Nudr interface, an Naf interface, and/or one or more other SBIs.

UPF 705 may include one or more devices, systems, VNFs, CNFs, etc., that receive, route, process, and/or forward traffic (e.g., user plane traffic). As discussed above, UPF 705 may communicate with UE 103 via one or more communication sessions, such as PDU sessions. Such PDU sessions may be associated with a particular network slice or other suitable QoS parameters, as noted above. UPF 705 may receive downlink user plane traffic (e.g., voice call traffic, data traffic, etc. destined for UE 103) from DN 650, and may forward the downlink user plane traffic toward UE 103 (e.g., via RAN 610). In some embodiments, multiple UPFs 705 may be deployed (e.g., in different geographical locations), and the delivery of content to UE 103 may be coordinated via the N9 interface. Similarly, UPF 705 may receive uplink traffic from UE 103 (e.g., via RAN 610), and may forward the traffic toward DN 650. In some embodiments, UPF 705 may implement, may be implemented by, may be communicatively coupled to, and/or may otherwise be associated with UPF/PGW-U 635. In some embodiments, UPF 705 may communicate (e.g., via the N4 interface) with SMF 703, regarding user plane data processed by UPF 705 (e.g., to provide analytics or reporting information, to receive policy and/or authorization information, etc.).

PCF 707 may include one or more devices, systems, VNFs, CNFs, etc., that aggregate, derive, generate, etc. policy information associated with the 5GC and/or UEs 103 that communicate via the 5GC and/or RAN 610. PCF 707 may receive information regarding policies and/or subscriptions from one or more sources, such as subscriber databases (e.g., UDM 709, UDR 713, etc.), and/or from one or more users such as, for example, an administrator associated with PCF 707. In some embodiments, the functionality of PCF 707 may be split into multiple network functions or subsystems, such as access and mobility PCF ("AM-PCF") 717, session management PCF ("SM-PCF") 719, UE PCF ("UE-PCF") 721, and so on. Such different "split" PCFs may be associated with respective SBIs (e.g., AM-PCF 717 may be associated with an Nampcf SBI, SM-PCF 719 may be associated with an Nsmpcf SBI, UE-PCF 721 may be associated with an Nuepcf SBI, and so on) via which other network functions may communicate with the split PCFs. The split PCFs may maintain information regarding policies associated with different devices, systems, and/or network functions.

NRF 711 may include one or more devices, systems, VNFs, CNFs, etc. that maintain routing and/or network topology information associated with the 5GC. For example, NRF 711 may maintain and/or provide IP addresses of one or more network functions, routes associated with one or more network functions, discovery and/or mapping information associated with particular network functions or network function instances (e.g., whereby such discovery and/or or mapping information may facilitate the SBA), and/or other suitable information.

UDR 713 may include one or more devices, systems, VNFs, CNFs, etc. that provide user and/or subscriber information, based on which PCF 707 and/or other elements of environment 700 may determine access policies, QoS policies, charging policies, or the like. In some embodiments, UDR 713 may receive such information from UDM 709 and/or one or more other sources.

NEF 715 include one or more devices, systems, VNFs, CNFs, etc. that provide access to information, APIs, and/or other operations or mechanisms of the 5GC to devices or systems that are external to the 5GC. NEF 715 may maintain authorization and/or authentication information associated with such external devices or systems, such that NEF 715 is able to provide information, that is authorized to be provided, to the external devices or systems. Such information may be received from other network functions of the 5GC (e.g., as authorized by an administrator or other suitable entity associated with the 5GC), such as SMF 703, UPF 705, a charging function ("CHF") of the 5GC, and/or other suitable network function. NEF 715 may communicate with external devices or systems (e.g., external devices 654) via DN 650 and/or other suitable communication pathways.

While environment 700 is described in the context of a 5GC, as noted above, environment 700 may, in some embodiments, include or implement one or more other types of core networks. For example, in some embodiments, environment 700 may be or may include a converged packet core, in which one or more elements may perform some or all of the functionality of one or more 5GC network functions and/or one or more EPC network functions. For example, in some embodiments, AMF 615 may include, may implement, may be implemented by, and/or may otherwise be associated with MME 616; SMF 703 may include, may implement, may be implemented by, and/or may otherwise be associated with SGW 617; PCF 707 may include, may implement, may be implemented by, and/or may otherwise be associated with a PCRF (e.g., PCF/PCRF 625); NEF 715 may include, may implement, may be implemented by, and/or may otherwise be associated with a SCEF (e.g., NEF/SCEF 649); and so on.

Figure 8:
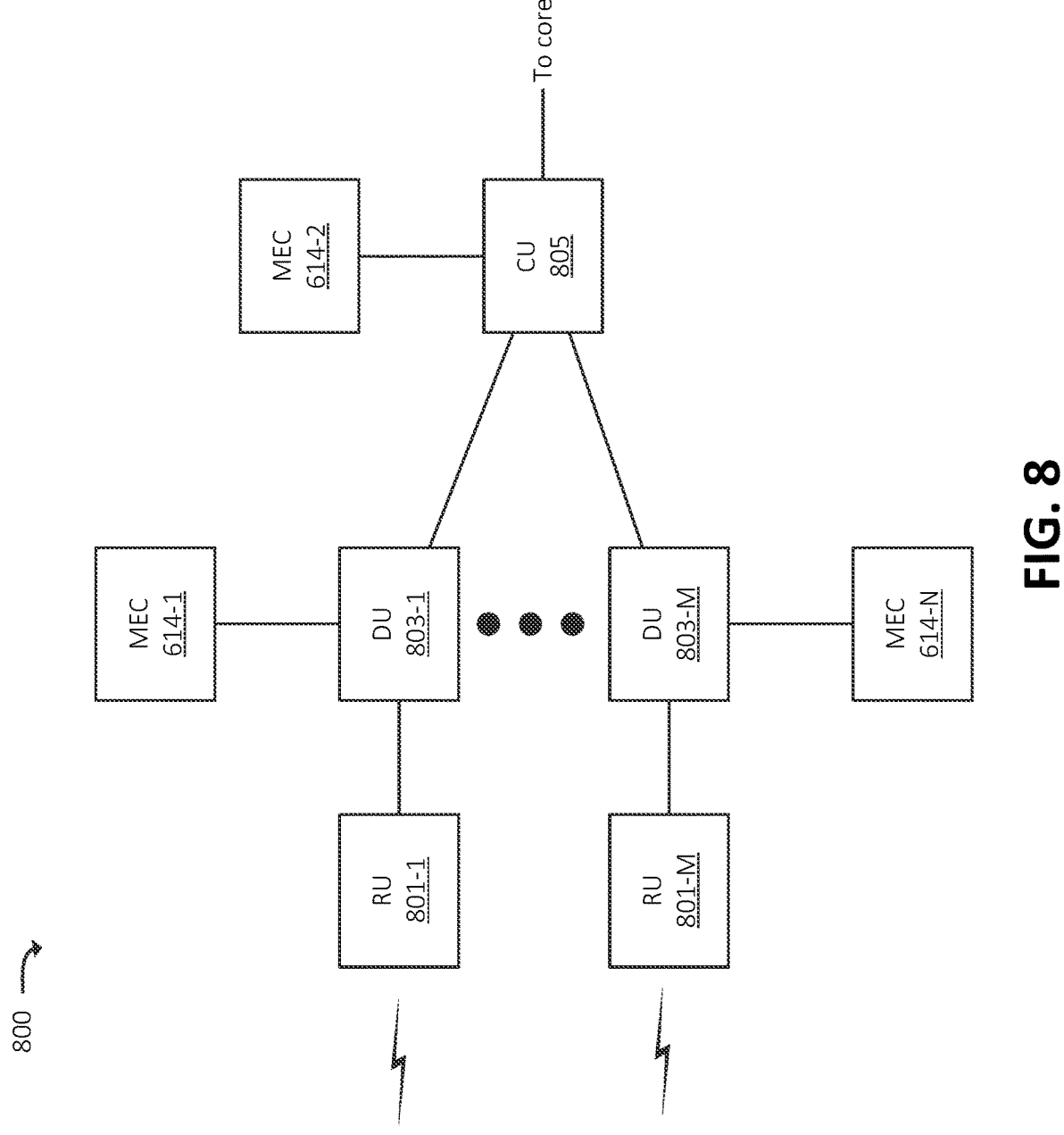
FIG. 8 illustrates an example arrangement of a RAN, in accordance with some embodiments.

FIG. 8 illustrates an example RAN environment 800, which may be included in and/or implemented by one or more RANs (e.g., RAN 610 or some other RAN). In some embodiments, a particular RAN 610 may include one RAN environment 800. In some embodiments, a particular RAN 610 may include multiple RAN environments 800. In some embodiments, RAN environment 800 may correspond to a particular gNB 611 of RAN 610. In some embodiments, RAN environment 800 may correspond to multiple gNBs 611. In some embodiments, RAN environment 800 may correspond to one or more other types of base stations of one or more other types of RANs. As shown, RAN environment 800 may include Central Unit ("CU") 805, one or more Distributed Units ("DUs") 803-1 through 803-M (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 615 and/or UPF 705) and/or some other device or system such as MEC 614. In the uplink direction (e.g., for traffic from UEs 103 to a core network), CU 805 may aggregate traffic from DUs 803, and forward the aggregated traffic to the core network. In some embodiments, CU 805 may receive traffic according to a given protocol (e.g., Radio Link Control ("RLC") traffic) from DUs 803, and may perform higher-layer processing (e.g., may aggregate/process RLC packets and generate Packet Data Convergence Protocol ("PDCP") packets based on the RLC packets) on the traffic received from DUs 803.

CU 805 may receive downlink traffic (e.g., traffic from the core network, traffic from a given MEC 614, etc.) for a particular UE 103, and may determine which DU(s) 803 should receive the downlink traffic. DU 803 may include one or more devices that transmit traffic between a core network (e.g., via CU 805) and UE 103 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 103.

RU 801 may include hardware circuitry (e.g., one or more RF transceivers, antennas, radios, and/or other suitable hardware) to communicate wirelessly (e.g., via an RF interface) with one or more UEs 103, one or more other DUs 803 (e.g., via RUs 801 associated with DUs 803), and/or any other suitable type of device. In the uplink direction, RU 801 may receive traffic from UE 103 and/or another DU 803 via the RF interface and may provide the traffic to DU 803. In the downlink direction, RU 801 may receive traffic from DU 803, and may provide the traffic to UE 103 and/or another DU 803.

One or more elements of RAN environment 800 may, in some embodiments, be communicatively coupled to one or more MECs 614. For example, DU 803-1 may be communicatively coupled to MEC 614-1, DU 803-M may be communicatively coupled to MEC 614-N, CU 805 may be communicatively coupled to MEC 614-2, and so on. MECs 614 may include hardware resources (e.g., configurable or provisionable hardware resources) that may be configured to provide services and/or otherwise process traffic to and/or from UE 103, via a respective RU 801.

For example, DU 803-1 may route some traffic, from UE 103, to MEC 614-1 instead of to a core network via CU 805. MEC 614-1 may process the traffic, perform one or more computations based on the received traffic, and may provide traffic to UE 103 via RU 801-1. As discussed above, MEC 614 may include, and/or may implement, some or all of the functionality described above with respect to UPF 705, AF 630, and/or one or more other devices, systems, VNFs, CNFs, etc. In this manner, ultra-low latency services may be provided to UE 103, as traffic does not need to traverse DU 803, CU 805, links between DU 803 and CU 805, and an intervening backhaul network between RAN environment 800 and the core network.

Figure 9:
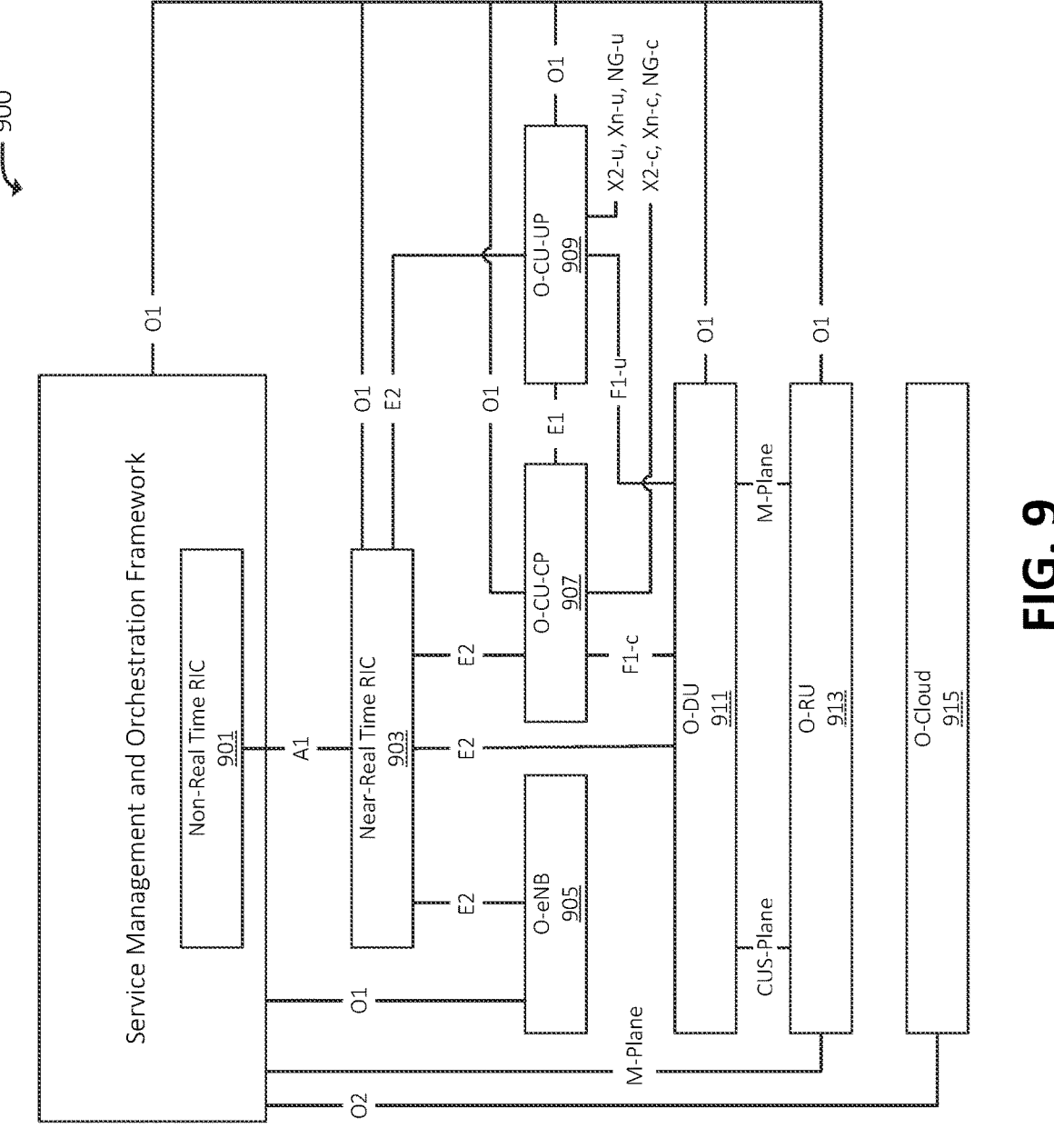
FIG. 9 illustrates an example arrangement of an Open RAN ("O-RAN") environment in which one or more embodiments, described herein, may be implemented.

FIG. 9 illustrates an example O-RAN environment 900, which may correspond to RAN 610, RAN 612, and/or RAN environment 800. For example, RAN 610, RAN 612, and/or RAN environment 800 may include one or more instances of O-RAN environment 900, and/or one or more instances of O-RAN environment 900 may implement RAN 610, RAN 612, RAN environment 800, and/or some portion thereof. As shown, O-RAN environment 900 may include Non-Real Time Radio Intelligent Controller ("RIC") 901, Near-Real Time RIC 903, O-eNB 905, O-CU-Control Plane ("O-CU-CP") 907, O-CU-User Plane ("O-CU-UP") 909, O-DU 911, O-RU 913, and O-Cloud 915. In some embodiments, O-RAN environment 900 may include additional, fewer, different, and/or differently arranged components or interfaces.

In some embodiments, some or all of the elements of O-RAN environment 900 may be implemented by one or more configurable or provisionable resources, such as virtual machines, cloud computing systems, physical servers, and/or other types of configurable or provisionable resources.

In some embodiments, some or all of O-RAN environment 900 may be implemented by, and/or communicatively coupled to, one or more MECs 614.

Non-Real Time RIC 901 and Near-Real Time RIC 903 may receive performance information (and/or other types of information) from one or more sources, and may configure other elements of O-RAN environment 900 based on such performance or other information. For example, Near-Real Time RIC 903 may receive performance information, via one or more E2 interfaces, from O-eNB 905, O-CU-CP 907, and/or O-CU-UP 909, and may modify parameters associated with O-eNB 905, O-CU-CP 907, and/or O-CU-UP 909 based on such performance information. Similarly, Non-Real Time RIC 901 may receive performance information associated with O-eNB 905, O-CU-CP 907, O-CU-UP 909, and/or one or more other elements of O-RAN environment 900 and may utilize machine learning and/or other higher level computing or processing to determine modifications to the configuration of O-eNB 905, O-CU-CP 907, O-CU-UP 909, and/or other elements of O-RAN environment 900.

In some embodiments, Non-Real Time RIC 901 may generate machine learning models based on performance information associated with O-RAN environment 900 or other sources, and may provide such models to Near-Real Time RIC 903 for implementation. In some embodiments, such machine learning models may include RAN scheduling models based on which one or more RRPSs 101 perform scheduling operations, as discussed below, with respect to traffic sent or received via one or more base stations 109. In some embodiments, Non-Real Time RIC 901 and/or Near- Real Time RIC 903 may implement or may be communicatively coupled to RRRC 401. As discussed above, RRRC 401 may refine RAN scheduling models based on information received from multiple RRPSs 101 and/or other sources, and may provide the refined RAN scheduling models to RRPSs 101 for implementation at respective base stations 109.

O-eNB 905 may perform functions similar to those described above with respect to gNB 611 and/or eNB 613. For example, O-eNB 905 may facilitate wireless communications between UE 601 and a core network. O-CU-CP 907 may perform control plane signaling to coordinate the aggregation and/or distribution of traffic via one or more DUs 803, which may include and/or be implemented by one or more O-DUs 911, and O-CU-UP 909 may perform the aggregation and/or distribution of traffic via such DUs 803 (e.g., O-DUs 911). O-DU 911 may be communicatively coupled to one or more RUs 801, which may include and/or may be implemented by one or more O-RUs 913. In some embodiments, O-Cloud 915 may include or be implemented by one or more MECs 614, which may provide services, and may be communicatively coupled, to O-CU-CP 907, O-CU-UP 909, O-DU 911, and/or O-RU 913 (e.g., via an O1 and/or O2 interface).

Figure 10:
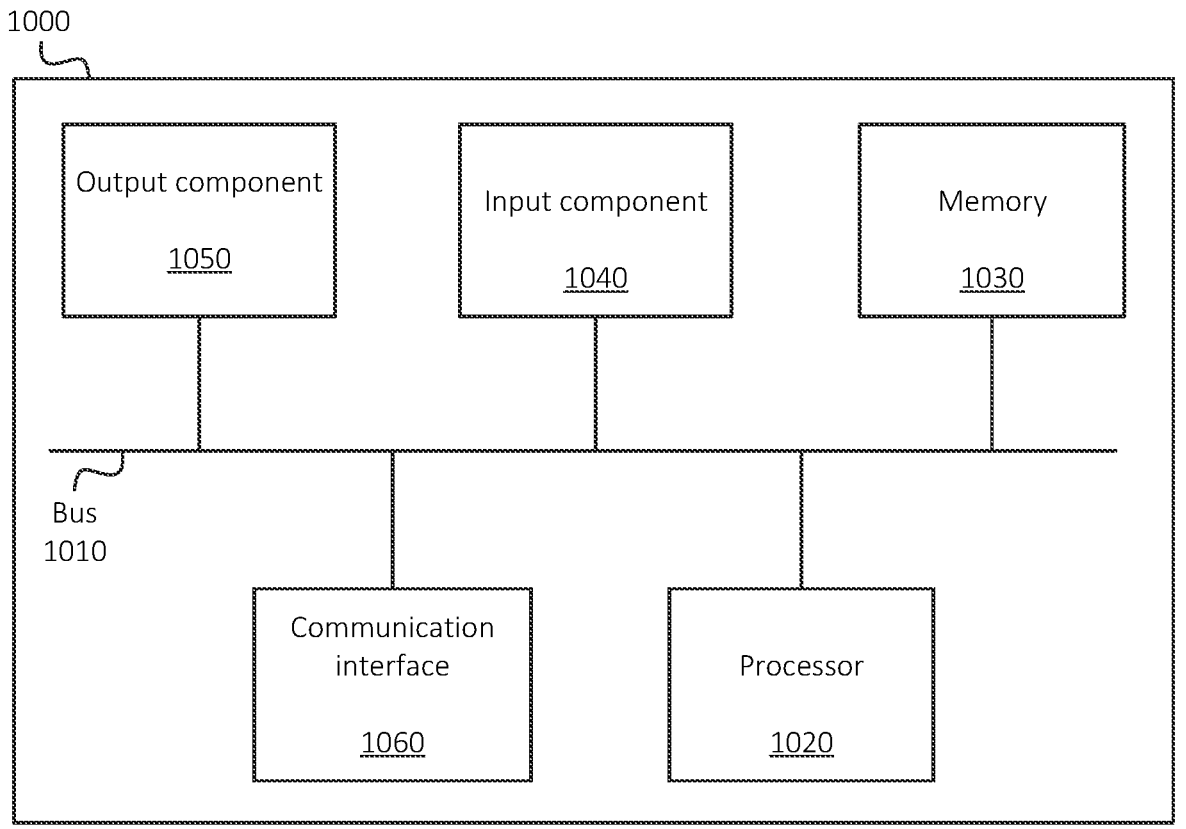
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, a set of provisioned hardware resources of a cloud computing system, or other suitable type of hardware that interprets and/or executes instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems (e.g., via RAN 610, RAN 612, DN 650, etc.). For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1000 may include more than one communication interface 1060. For instance, device 1000 may include an optical interface, a wireless interface, an Ethernet interface, and/or one or more other interfaces.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information. No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify a plurality of radio Key Performance Indicators ("KPIs") associated with a plurality of User Equipment ("UEs") that are connected to a radio access network ("RAN"), wherein each radio KPI is associated with wireless communications between a respective UE and the RAN;
identify a plurality of service categories associated with the plurality of UEs, wherein each particular UE is associated with a respective service category;
determine, based on the radio KPIs and the service category associated with each UE of the plurality of UEs, a particular radio resource partitioning configuration for the RAN, wherein the particular radio resource partitioning configuration specifies that:
a first portion of a set of radio resources, implemented by the RAN, is associated with a first network slice, and
a second portion of the set of radio resources, implemented by the RAN, is associated with a second network slice; and
instruct the RAN to implement the particular radio resource partitioning configuration, wherein the RAN implements the particular radio resource partitioning configuration by:
sending and receiving wireless traffic, associated with the first network slice, via the first portion of the set of radio resources, and
sending and receiving wireless traffic, associated with the second network slice, via the first portion of the set of radio resources.

2. The device of claim 1, wherein the first portion of the set of radio resources includes a first set of frequencies, and wherein the second portion of the set of radio resources includes a second set of frequencies.

3. The device of claim 1, wherein a particular service category associated with a particular UE, of the plurality of UEs, is based on at least one of:
a set of traffic types associated with the particular UE,
a set of Quality of Service ("QoS") parameters associated with the particular UE, or
a device type of the particular UE.

4. The device of claim 3, wherein the set of QoS parameters associated with the particular UE include at least one of:
a network slice associated with traffic sent or received by the UE,
one or more latency thresholds associated with traffic sent or received by the UE, or
one or more throughput thresholds associated with traffic sent or received by the UE.

5. The device of claim 1, wherein radio KPIs associated with a particular UE, of the plurality of UEs, include at least one of:
Signal-to-Interference-and-Noise-Ratio ("SINR") associated with wireless communications between the UE and the RAN,
Received Signal Strength Indicator ("RSSI") values associated with wireless communications between the UE and the RAN,
Reference Signal Received Power ("RSRP") values associated with wireless communications between the UE and the RAN,
Reference Signal Received Quality ("RSRQ") values associated with wireless communications between the UE and the RAN, or
Channel Quality Indicator ("CQI") values associated with wireless communications between the UE and the RAN.

6. The device of claim 1, wherein a first UE, of the plurality of UEs, is associated with a first set of radio KPIs, and wherein a second UE, of the plurality of UEs, is associated with a second set of radio KPIs.

7. The device of claim 1, wherein the plurality of UEs are connected to a same base station of the RAN.

8. A non-transitory computer-readable medium, storing a plurality of processor-executable instructions to:
identify a plurality of radio Key Performance Indicators ("KPIs") associated with a plurality of User Equipment ("UEs") that are connected to a radio access network ("RAN"), wherein each radio KPI is associated with wireless communications between a respective UE and the RAN;
identify a plurality of service categories associated with the plurality of UEs, wherein each particular UE is associated with a respective service category;
determine, based on the radio KPIs and the service category associated with each UE of the plurality of UEs, a particular radio resource partitioning configuration for the RAN, wherein the particular radio resource partitioning configuration specifies that:

a first portion of a set of radio resources, implemented by the RAN, is associated with a first network slice, and a second portion of the set of radio resources, implemented by the RAN, is associated with a second network slice; and instruct the RAN to implement the particular radio resource partitioning configuration, wherein the RAN implements the particular radio resource partitioning configuration by:

sending and receiving wireless traffic, associated with the first network slice, via the first portion of the set of radio resources, and sending and receiving wireless traffic, associated with the second network slice, via the first portion of the set of radio resources.

9. The non-transitory computer-readable medium of claim 8, wherein the first portion of the set of radio resources includes a first set of frequencies, and wherein the second portion of the set of radio resources includes a second set of frequencies.

10. The non-transitory computer-readable medium of claim 8, wherein a particular service category associated with a particular UE, of the plurality of UEs, is based on at least one of:

a set of traffic types associated with the particular UE, a set of Quality of Service ("QoS") parameters associated with the particular UE, or a device type of the particular UE.

11. The non-transitory computer-readable medium of claim 10, wherein the set of QoS parameters associated with the particular UE include at least one of:

a network slice associated with traffic sent or received by the UE, one or more latency thresholds associated with traffic sent or received by the UE, or one or more throughput thresholds associated with traffic sent or received by the UE.

12. The non-transitory computer-readable medium of claim 8, wherein radio KPIs associated with a particular UE, of the plurality of UEs, include at least one of:

Signal-to-Interference-and-Noise-Ratio ("SINR") associated with wireless communications between the UE and the RAN, Received Signal Strength Indicator ("RSSI") values associated with wireless communications between the UE and the RAN, Reference Signal Received Power ("RSRP") values associated with wireless communications between the UE and the RAN, Reference Signal Received Quality ("RSRQ") values associated with wireless communications between the UE and the RAN, or Channel Quality Indicator ("CQI") values associated with wireless communications between the UE and the RAN.

13. The non-transitory computer-readable medium of claim 8, wherein a first UE, of the plurality of UEs, is associated with a first set of radio KPIs, and wherein a second UE, of the plurality of UEs, is associated with a second set of radio KPIs.

14. The non-transitory computer-readable medium of claim 8, wherein the plurality of UEs are connected to a same base station of the RAN.

15. A method, comprising:

identifying a plurality of radio Key Performance Indicators ("KPIs") associated with a plurality of User Equipment ("UEs") that are connected to a radio access network ("RAN"), wherein each radio KPI is associated with wireless communications between a respective UE and the RAN;

identifying a plurality of service categories associated with the plurality of UEs, wherein each particular UE is associated with a respective service category;

determining, based on the radio KPIs and the service category associated with each UE of the plurality of UEs, a particular radio resource partitioning configuration for the RAN, wherein the particular radio resource partitioning configuration specifies that:

a first portion of a set of radio resources, implemented by the RAN, is associated with a first network slice, and a second portion of the set of radio resources, implemented by the RAN, is associated with a second network slice; and instructing the RAN to implement the particular radio resource partitioning configuration, wherein the RAN implements the particular radio resource partitioning configuration by:

sending and receiving wireless traffic, associated with the first network slice, via the first portion of the set of radio resources, and sending and receiving wireless traffic, associated with the second network slice, via the first portion of the set of radio resources.

16. The method of claim 15, wherein the first portion of the set of radio resources includes a first set of frequencies, and wherein the second portion of the set of radio resources includes a second set of frequencies.

17. The method of claim 15, wherein a particular service category associated with a particular UE, of the plurality of UEs, is based on at least one of:

a set of traffic types associated with the particular UE, a set of Quality of Service ("QoS") parameters associated with the particular UE, or a device type of the particular UE.

18. The method of claim 17, wherein the set of QoS parameters associated with the particular UE include at least one of:

a network slice associated with traffic sent or received by the UE, one or more latency thresholds associated with traffic sent or received by the UE, or one or more throughput thresholds associated with traffic sent or received by the UE.

19. The method of claim 15, wherein radio KPIs associated with a particular UE, of the plurality of UEs, include at least one of:

Signal-to-Interference-and-Noise-Ratio ("SINR") associated with wireless communications between the UE and the RAN, Received Signal Strength Indicator ("RSSI") values associated with wireless communications between the UE and the RAN, Reference Signal Received Power ("RSRP") values associated with wireless communications between the UE and the RAN, Reference Signal Received Quality ("RSRQ") values associated with wireless communications between the UE and the RAN, or Channel Quality Indicator ("CQI") values associated with wireless communications between the UE and the RAN.

20. The method of claim 15, wherein a first UE, of the plurality of UEs, is associated with a first set of radio KPIs, and wherein a second UE, of the plurality of UEs, is associated with a second set of radio KPIs.

\* \* \* \* \*